United States Patent
Garvey et al.

(10) Patent No.: US 11,079,748 B1
(45) Date of Patent: Aug. 3, 2021

(54) IN-PROCESS DIGITAL TWINNING

(71) Applicant: GRALE TECHNOLOGIES, Youngstown, OH (US)

(72) Inventors: Michael Garvey, Youngstown, OH (US); Fred Persi, Youngstown, OH (US); Matthew Walther, Youngstown, OH (US)

(73) Assignee: GRALE TECHNOLOGIES, Youngstown, OH (US)

( * ) Notice: Subject to any disclaimer, the term of this patent is extended or adjusted under 35 U.S.C. 154(b) by 0 days.

(21) Appl. No.: 16/861,397

(22) Filed: Apr. 29, 2020

(51) Int. Cl.
*G05B 19/418* (2006.01)
*G05B 19/4093* (2006.01)

(52) U.S. Cl.
CPC . *G05B 19/41885* (2013.01); *G05B 19/40936* (2013.01); *G05B 19/4183* (2013.01)

(58) Field of Classification Search
None
See application file for complete search history.

(56) References Cited

U.S. PATENT DOCUMENTS 2,820,187 A  1/1958 Parsons et al.
4,571,149 A  2/1986 Soroka et al.
9,222,769 B2  12/2015 Garvey et al.
9,528,826 B2  12/2016 Garvey et al.
10,295,341 B2  5/2019 Garvey et al.

OTHER PUBLICATIONS

International Search Report & Written Opinion for PCT Application Serial No. PCT/US2021/027405, dated May 11, 2021, 7 pages.

*Primary Examiner* — Carlos R Ortiz Rodriguez
(74) *Attorney, Agent, or Firm* — Amin, Turocy & Watson, LLP

(57) ABSTRACT

A manufacturing control system for an additive, subtractive, or hybrid machining system implements in situ part inspection to collect as-built metrology data for a manufactured part while the part remains in the work envelop, and uses the resulting measured inspection data to generate an as-built digital twin that accurately models the finished part. After execution of a subtractive and/or additive tooling operation, the system performs a sensor scan to collect three-dimensional imaging measurement data for the resulting manufactured part while the part remains in the work cell. The measurement data is then integrated with as-designed part metadata for the idealized part to yield the as-built digital twin. Since metrology measurements are integrated into the manufacturing process, customized as-built digital twins can be generated for each manufactured part without requiring manual inspections to be performed on each part.

20 Claims, 18 Drawing Sheets

IN-PROCESS DIGITAL TWINNING

TECHNICAL FIELD

This disclosure generally relates to industrial manufacturing, and, more specifically, to additive, subtractive, and hybrid manufacturing control systems.

BACKGROUND

Modern manufacturing processes that involve machining of stock material or deposition of material to form finished products, or components of larger assembled products, often employ programmable manufacturing tools in order to achieve automation, product consistency, and precision. For example, in the case of subtractive manufacturing, numerically controlled (NC) systems—which include computer numerically controlled (CNC) machines—are typically used to control one or more machining tools that perform subtractive machining to a unit of stock material to yield a final workpiece or part that conforms to design specifications. In the case of additive manufacturing, a three-dimensional (3D) printer may control an additive disposition head that deposits material in a controlled manner to form a finished part having a defined shape or topology. Hybrid manufacturing systems may employ both additive and subtractive manufacturing processes to yield a finished part.

In the realm of manufacturing, collection of as-built metrology data representing the measured geometry and/or inspection results for a machined part is typically a manual process conducted by a skilled technician. For example, inspection of an aircraft engine airfoil after manufacturing and prior to putting the airfoil in service may require moving the airfoil to an inspection station where the three-dimensional (3D) as-built part geometry is collected using a coordinate measuring machine (CMM) or another type of instrument. The as-built part geometry may deviate from the as-designed dimensions to varying degrees across instances of the manufactured part. Manufactured parts whose dimensions deviate from the as-designed dimensions are typically accepted nonetheless provided the dimensions of the respective part surfaces are within tolerance.

In practice, collecting inspection data for every manufactured part produced by an industrial enterprise is prohibitively expensive and time-consuming.

The above-described is merely intended to provide an overview of some of the challenges facing conventional manufacturing systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

One or more embodiments described herein relate to machining systems that implement an in-process inspection and digital twinning approach. In one or more embodiments, a subtractive, additive, or hybrid (subtractive and additive) manufacturing system (e.g., a CNC machine, a 3D printer) can perform in situ inspection measurements on a machined part before or after machining operations have been performed on the part. In some implementations, these inspections can be performed by metrology sensors within the machining work cell that are attached to the same operating arm or spindle as the machining tool. In such configurations, an inspection sequence can be performed subsequent to the machining sequence to collect measured inspection data for the part without removing the part from the work envelope. Since the same operating arm is used to machine the part and collect as-built metrology data for the resulting machined part, the inspection data can be collected using the same coordinate system as the machining tool as the frame of reference, mitigating the need to re-align the inspection data to conform to the coordinate system of the manufacturing data.

Since inspection data is collected for each machined part in this manner, one or more embodiments of the system can add this inspection data to metadata for the part being manufactured to yield a part-specific, as-built digital twin for each part. This digital twin can be used in a variety of applications, including but not limited to part simulations, intelligent control of a mechanical system that incorporates the finished part, identifying sets of component parts having complementary geometries to optimize the integrity of machine assemblies, monitoring the part while in service to determine whether the part is wearing or performing as expected, or other such applications.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
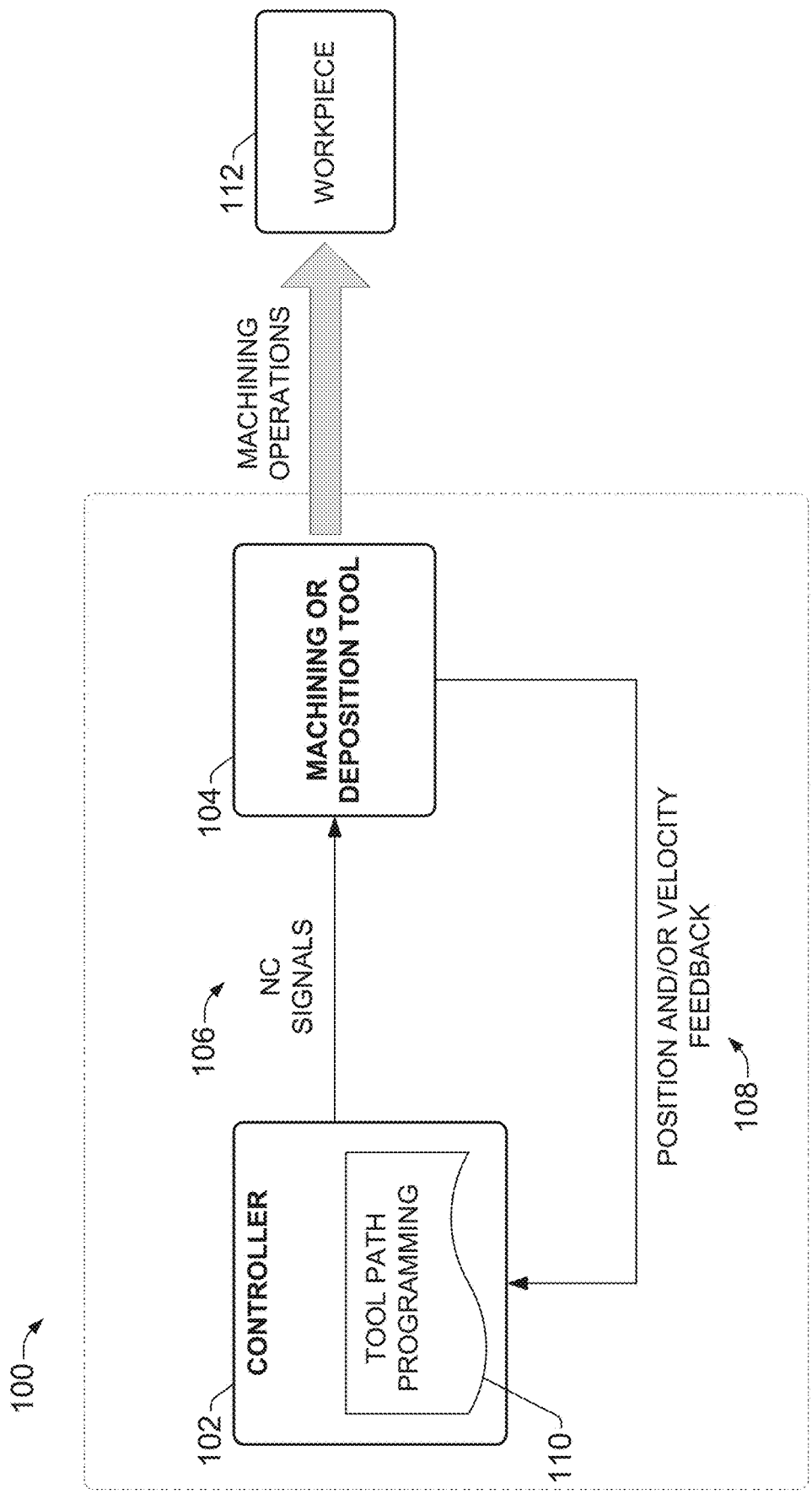
FIG. 1 is a block diagram illustrating a generalized high-level architecture of an example manufacturing machine used to manufacture a workpiece or part using additive and/or subtractive manufacturing methods.

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

Systems and methods described herein relate generally to a manufacturing approach whereby inspection data (e.g., measured metrology or geometric data) for a manufactured part is collected while the part is still within the work envelop, and this inspection data is joined with other metadata for the part to yield an as-built part-specific digital twin that accurately models the finished part, including any deviations of the part's geometry or behaviors from the idealized or as-designed geometry or behaviors. This industrial digital twinning approach can be implemented in substantially any type of subtractive, additive, or hybrid (additive and subtractive) manufacturing system, including but not limited to CNC machines, 3D printers, robotic systems, or other such systems. This digital twin can be used in a variety of applications that benefit from accurate virtual models of the finished part, including but not limited to part simulations, intelligent control systems that monitor and control a mechanical system that incorporates the finished part, assembly systems that identify disparate component parts having complementary geometries to optimize the integrity of machine assemblies, diagnostic systems that monitor the part while in service to determine whether the part is wearing or performing as expected, or other such applications.

Although some examples described and illustrated are presented in the context of a CNC machining system and process (a subtractive manufacturing process), it is to be appreciated that the in situ measurement and digital twin creation techniques described herein are also applicable to other types of manufacturing systems, including additive, subtractive, and hybrid systems. For example, in addition to implementation in a CNC machine that controls a machining tool to perform subtractive operations on a unit of stock material, the approaches described herein for performing in situ measurements and generating part-specific digital twins can also be implemented in a 3D printing system that controls a disposition head to form a finished part through deposition or addition of material in a controlled manner. These approaches are also applicable to hybrid manufacturing systems that perform both additive and subtractive processes to form a finished part or workpiece.

FIG. 1 is a block diagram illustrating a generalized high-level architecture of an example manufacturing machine 100 used to manufacture a workpiece or part using additive and/or subtractive manufacturing methods. Manufacturing machine 100 may be, for example, a CNC machine that forms a finished product by performing machining operations on a unit of stock material, or a 3D printer that forms a finished product by controlled deposition of material. A controllable tool 104 operates under the control of a controller 102. In the case of a CNC system or another type of subtractive manufacturing system, tool 104 may be a machining tool, such as a drill, a lathe, a shaper, a mill, or other such machining tool capable of shaping a piece of stock material (e.g., metal, plastic, etc.) using subtractive or machining processes to yield a finished workpiece 112. In the case of a 3D printer or another type of additive manufacturing system, tool 104 may be a deposition head that deposits material in a controlled manner to build the finished workpiece 112. Some tools 104 may be attached to robotic operating arms that can be articulated over multiple independently controllable axes of motion, allowing the tool 104 to be manipulated along a wide range of positions and orientations as the workpiece is held fixed on a bed or other surface within the work area. For example, a five-axis CNC machine may support three linear axes of motion (x-axis, y-axis, and z-axis) and two rotational axes of motion (e.g., a-axis and c-axis). The three-dimensional volume within which the tool can be moved is referred to as the work envelope.

Tool 104 is controlled by a controller 102 in accordance with tool path programming 110 that defines the movements and operations to be carried out by the tool 104 during a machine cycle. Tool path programming 110 defines the movements of respective axes of motion of the tool 104 as well as the timings of these movements. Tool path programming 110 also defines the timings of tooling operations (e.g., machining or deposition operations) to be performed as the tool 104 traverses these defined paths (e.g., drilling operations, cutting operations, etc.). Controller 102 translates these defined movements and operations to NC signals 106 that are delivered to the tool's drive system, causing the tool 104 to carry out the defined movements and operations.

In the illustrated example, controller 102 controls the tool 104 in a closed-loop manner. Position and/or velocity feedback data 108 measured by sensors associated with the tool 104 (e.g., encoders or other such data sources) are fed back to the controller 102, which corrects the movement of the tool 104 if necessary based on calculated deviations between the actual tool position or velocity (as reported by feedback data 108) and the programmed position or velocity to ensure that the tool's movements and operations accord with the programmed path.

Figure 2:
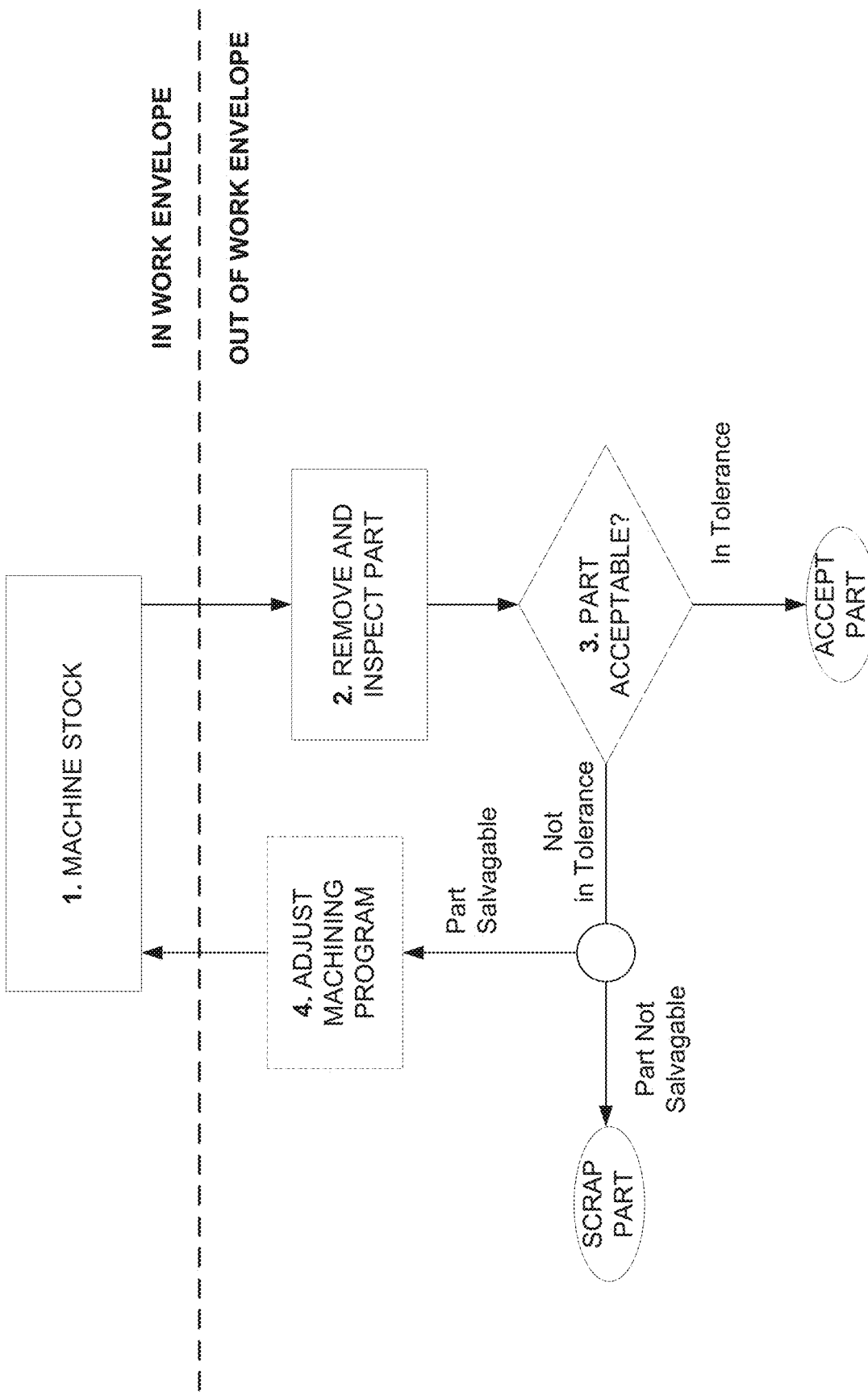
FIG. 2 is a flow diagram illustrating example machining and inspection phases for a machined part.

Typically, if the completed part is to be inspected, the finished product is removed from the work cell upon completion of the tooling cycle and inspected for defects or deviations from the part design in excess of defined tolerances. FIG. 2 is a flow diagram illustrating example machining and inspection phases for a machined part. Although this example workflow is described in connection with an example CNC machining process, a similar workflow is applicable to 3D printing processes or other additive, subtractive, or hybrid processes. Inside a CNC work envelope in which machining takes place, a piece of stock material (e.g., metal, plastic, glass, etc.) is machined by the machining tool 104 (step 1) in accordance with the CNC controller programming. Upon completion of a machining cycle, the resulting machined workpiece or part is removed from the work envelope and inspected at step 2. This inspection may be carried out, for example, at a separate inspection station or laboratory using a touch probe, a coordinate measuring machine (CMM), a laser measurement device, calipers, or another type of measurement or metrology device. The inspection is intended to determine whether the shape, dimensions, surface topology, or other key geometric features of the machined part are within design tolerances. At step 3, a determination is made as to whether the inspection results indicate that the machined part is within design tolerances.

If the machined workpiece is within tolerance, the workpiece is accepted and either added to equipment inventory or moved on to another machine for subsequent processing steps. Alternatively, if the workpiece is not within tolerance, the workpiece may be scrapped or, if salvageable, may be placed back in the machining work cell for further machining intended to bring the workpiece within design tolerance. This may involve adjusting the machine program or adjusting for tool wear at step 4 based on the degree and nature of the deviation from the as-designed specifications. This manual inspection and feedback process is time-consuming and involves a considerable degree of human intervention, since the workpiece must be measured by the operator, either in situ or by physically removing the workpiece from the machine for inspection. Consequently, manufactures typically resort to inspecting the first machined part of a production run followed by periodic inspection of selected parts for quality assurance purposes. As a result, potentially useful inspection metadata is not collected for most manufactured parts, leaving a considerable data gap in the manufacturing records. If collection of as-built metrology data can be integrated into the manufacturing process itself, useful inspection data could be collected for each manufactured part and leveraged for a variety of purposes, including but not limited to creation of part-specific digital twins that accurately model the geometry and behaviors of each part.

Moreover, part inspection data that is collected out-of-process—e.g., at a separate inspection station or laboratory—is often registered in a different coordinate system from that of the manufacturing process. Consequently, if the inspection data is to be accurately compared with an as-designed digital model of the idealized part for quality assurance purposes, or if the inspection data is to be compared with that of other parts machined at other machining work cells, the inspection data must be aligned to the coordinate system of the manufacturing data. This process can be laborious and prone to inaccuracies.

To address these and other issues, one or more embodiments described herein provide a manufacturing system (e.g., a CNC system, a 3D printer, or another type of subtractive, additive, or hybrid machining system) that incorporates automated as-built inspections into the manufacturing process within the same work envelope as the machining. This can achieve economies of operation that allow all manufactured parts to be inspected in-line with the machining process, and also makes possible creation of as-built digital twins for each manufactured part. In an example implementation, one or more embodiments of the disclosed machining system can combine generic part metadata representing global characteristics of a part category (e.g., a digital model of the as-designed part and/or other pertinent metadata describing characteristics that are applicable to all manufactured instances of the part category) with as-built inspection data for a specific machined part within that category to yield an as-built digital twin that accurately models the final part. The as-built digital twin can model the unique geometries and behaviors of the machined part, which may vary across finished parts produced by the same machining work cell.

Moreover, since inspection and manufacturing are combined within the same machining workspace, per-part inspection data can be collected in the same coordinate system as the generic part metadata or digital model, allowing the as-built inspection data to be easily integrated into the digital twin without the need to reconcile the two coordinate systems. For example, in some embodiments the sensor that performs the in situ inspection can be attached to the same spindle or operating arm as the machining tool, allowing the sensor to be maneuvered using the same articulating mechanism as the tool. This can ensure that a common coordinate system is used as the frame of reference for both inspection data and machining data without the need for separate reconciliation processing to align one set of data to the coordinate system of the other data set.

Figure 3:
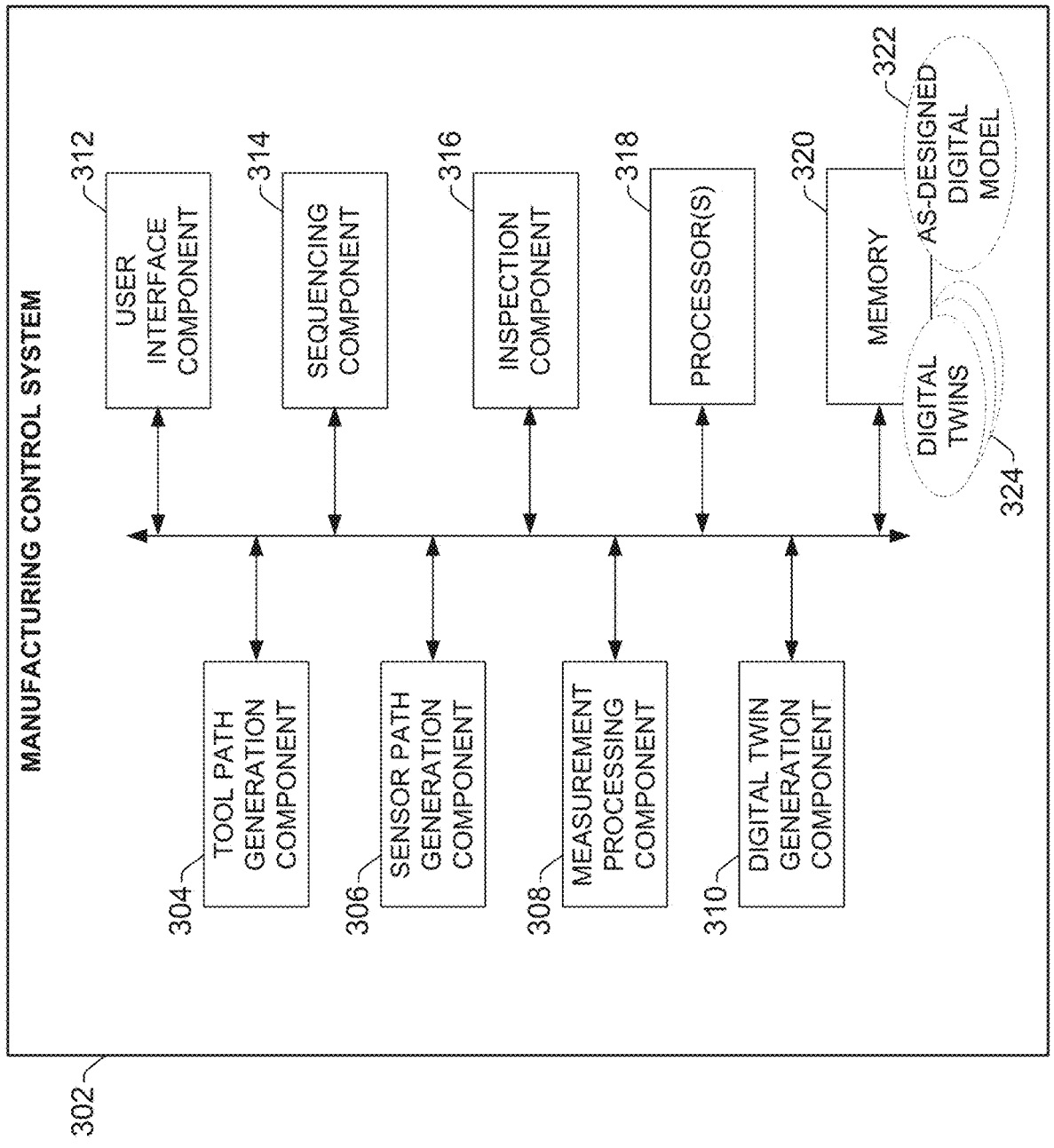
FIG. 3 is a block diagram of an example manufacturing control system capable of performing in situ inspections of a manufactured part and generating an as-built digital twin for the part.

FIG. 3 is a block diagram of an example manufacturing control system 302 capable of performing in situ inspections of a manufactured part and generating an as-built digital twin for the machined part. System 302 may be a control system for substantially any type of additive, subtractive, or hybrid (additive and subtractive) manufacturing system, including but not limited to a CNC machine, a 3D printer, or other such systems. Manufacturing control system 302 can include a tool path generation component 304, a sensor path generation component 306, a measurement processing component 308, a digital twin generation component 310, a user interface component 312, a sequencing component 314, an inspection component 316, one or more processors 318, and memory 320. In various embodiments, one or more of the tool path generation component 304, sensor path generation component 306, measurement processing component 308, digital twin generation component 310, user interface component 312, sequencing component 314, inspection component 316, the one or more processors 318, and memory 320 can be electrically and/or communicatively coupled to one another to perform one or more of the functions of the manufacturing control system 302. In some embodiments, components 304, 306, 308, 310, 312, 314, and 316 can comprise software instructions stored on memory 320 and executed by processor(s) 318. Manufacturing control system 302 may also interact with other hardware and/or software components not depicted in FIG. 3. For example, processor(s) 318 may interact with one or more external user interface device, such as a keyboard, a mouse, a display monitor, a touchscreen, or other such interface devices.

Tool path generation component 304 can be configured to determine a tool path (or a sequence of tool paths) capable of converting a unit of stock material into a finished part or workpiece (in the case of subtractive manufacturing) or depositing material in a manner that builds the finished part or workpiece (in the case of additive manufacturing) in accordance with an as-designed digital model 322 of the part, and generate corresponding tooling instructions (e.g., NC instructions) designed to drive a tool through the prescribed tool path. Digital model 322 can be, for example, a computer-aided design (CAD) model that defines the desired final geometry of the part. In some embodiments, digital model 322 322 may also define one or more expected behaviors of the idealized part. In general, the digital model 322 can represent as-designed characteristics of a category of part to be manufactured by the manufacturing system. The digital model 322 can model as-designed geometries, behaviors, and/or other characteristics of an idealized, as-designed version of the part. In various embodiments, the tool path may be at least partially defined by a user using suitable CAM software, or may be generated by the tool path generation component 304 based on analysis of the as-designed digital model 322 in view of the tool's motion capabilities. Tool path generation component 304 can also determine the suitable tool path using simulation techniques in some embodiments. The instructions generated by tool path generation component 304 can be directed to the drive system of a subtractive, additive, or hybrid machine under control of the system 302.

Sensor path generation component 306 can be configured to determine a suitable scan path of a metrology sensor for collecting inspection data for the processed part while the part is still in the manufacturing work envelope after tooling cycle has been performed (that is, without removing the part from the work cell), and to generate suitable sensor path instructions (e.g., NC instructions) for driving the sensor tool through the scan path. The sensor scan path is typically defined separately from the tool path. As with the machine tool path, sensor path generation component 306 can be configured to allow a machine programmer to design the sensor path, or may be configured to infer or otherwise generate a suitable sensor path based on the as-designed digital model 322. Sensor path generation component 306 may also determine a suitable sensor path using simulation techniques in some embodiments. Embodiments of manufacturing control system 302 in which the sensor is a fixed inspection device that collects data for the manufactured part without traversing a scan path (e.g., a high speed camera, a vision camera, a depth camera, or another sensor device having a fixed location) may omit the sensor path generation component 306.

Measurement processing component 308 can be configured to apply compensation processing to measurement data (e.g., 3D imaging data) received from the metrology sensor to account for sensor calibration and, if necessary, to place the measurement data in the same coordinate system as the digital model 322. The digital twin generation component 310 is configured to create a part-specific digital twin 324 representing the as-built part by combining the measured inspection data with other metadata associated with the part. This other metadata can include, but is not limited to, the as-designed digital model 322, generic part metadata defining global properties and behaviors of a part category to which the part belongs, manufacturing history or supply chain data for the part, simulation or test result data for the part, etc.

The user interface component 312 can be configured to receive user input and to render output to the user in any suitable format (e.g., visual, audio, tactile, etc.). User input can be, for example, as-designed part metadata, tool path or sensor path programming, or other such inputs. Output generated by the user interface component 312 can include part inspection or report information, sensor measurement information, or other such output data.

Sequencing component 314 can be configured to control the timing of execution of the tooling path instructions and the sensor path generation instructions, such that the sensor path instructions are executed upon completion of a tooling cycle to facilitate collection of inspection data for the machined part.

Inspection component 316 can be configured to compare the corrected measurement data with the as-designed digital model 322 to determine whether the manufactured part satisfies design tolerances, or alternatively if the tool should execute another machining operation to bring the part into tolerance.

The one or more processors 318 can perform one or more of the functions described herein with reference to the systems and/or methods disclosed. Memory 320 can be a computer-readable storage medium storing computer-executable instructions and/or information for performing the functions described herein with reference to the systems and/or methods disclosed.

Figure 4:
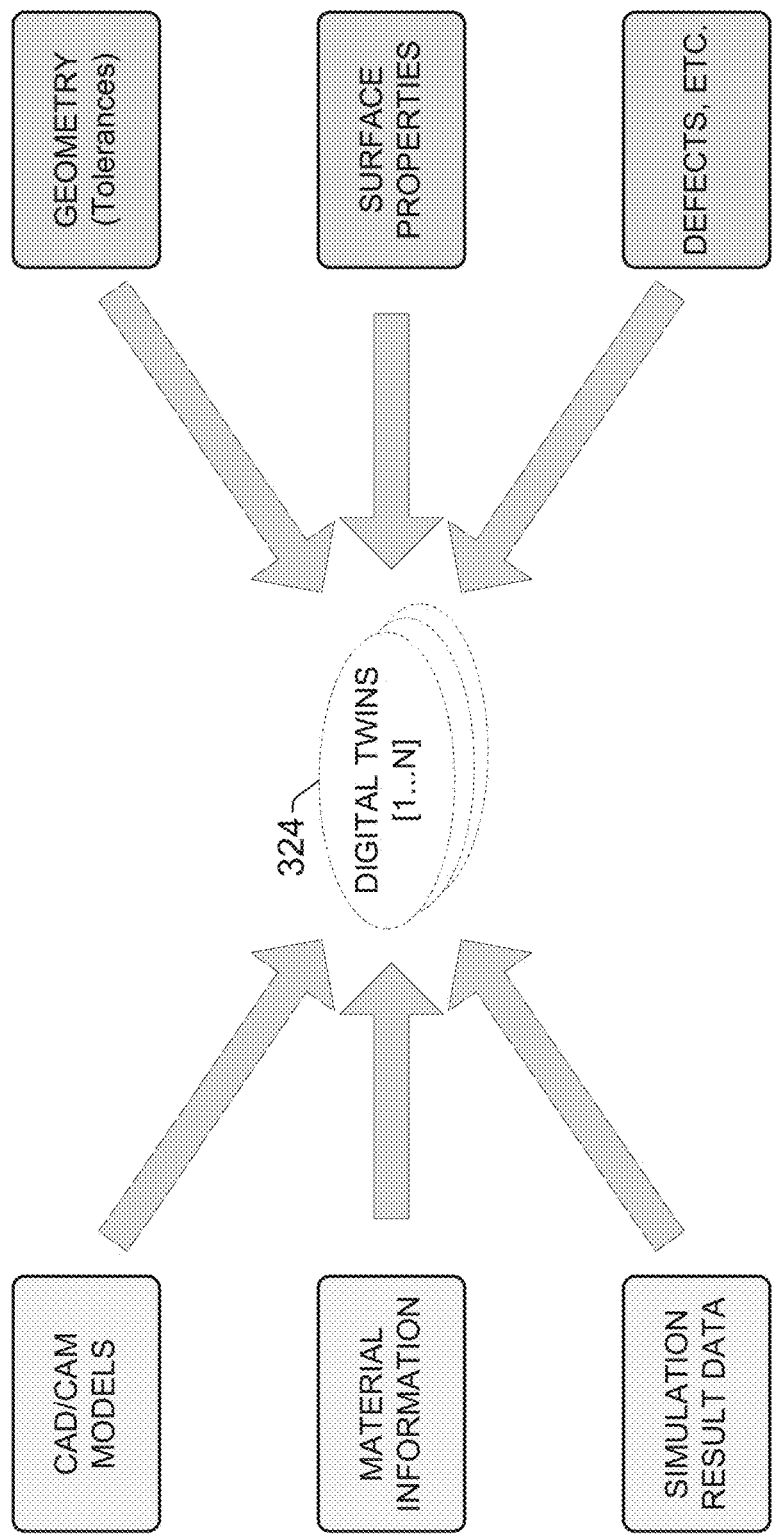
FIG. 4 is a diagram illustrating example types of information that can be integrated into an as-built digital twin for a machined part.

FIG. 4 is a diagram illustrating example types of information that can be integrated into an as-built digital twin 324 for a manufactured part according to one or more embodiments described herein. In general, a digital twin 324 generated by digital twin generation component 310 is an electronic or digital file that contains pertinent information about each unit of production (e.g., each part or workpiece), and that models the as-built geometry, properties, and behaviors of the finished part. Each digital twin 324 can model unique or idiosyncratic geometries, properties, or behaviors of its corresponding finished part that may vary across finished parts, including acceptable in-tolerance deviations from the as-designed part dimensions, part-specific responses to test scenarios or operating conditions (e.g., reaction times, accelerations, air flows, etc.), or other such properties. A digital twin 324 can model its corresponding finished part such that the digital twin 324 can be used to perform virtual simulations on the as-built part, to monitor operation of the physical part against expected operations, to optimize mechanical assemblies by identifying sets of component parts whose digital twins 324 suggest complementary tolerances, or to carry out other part modeling applications.

The data encoded into an as-built digital twin 324 can be classified into two categories—generic part metadata 402 that is globally applicable to all manufactured instances of the part design (depicted on the left-hand side of FIG. 4), and part-specific data 404 that is specific, and possible unique, to each manufactured instance of the part design (depicted on the right-hand side of FIG. 4).

Generic part metadata 402 that can be integrated into in the digital twin 324 can include, for example, as-designed CAD or CAM models of the part to be manufactured (e.g., digital model 322); information specifying the material used to produce the part; results of virtual simulations (e.g., finite element analysis) performed on a virtual instance of the as-designed part using digital design data, which models expected behaviors or performance of the idealized part; or other such information. In general, generic part metadata 402 represents properties that are globally applicable to all manufactured instances of a part category.

Part-specific data 404—representing characteristics that may vary between each actual manufactured part—can include, but is not limited to, the measured actual geometry of the finished part (including the direction and degree of acceptable in-tolerance deviations from the as-designed ideal geometry), measured surface properties, defects detected on the part's surface, results of performance or strength tests executed on the actual finished part, or other such information. At least some of this information can be obtained via in situ metrology measurements performed while the part is still in the work cell after machining is complete, as will be described below.

Figure 5:
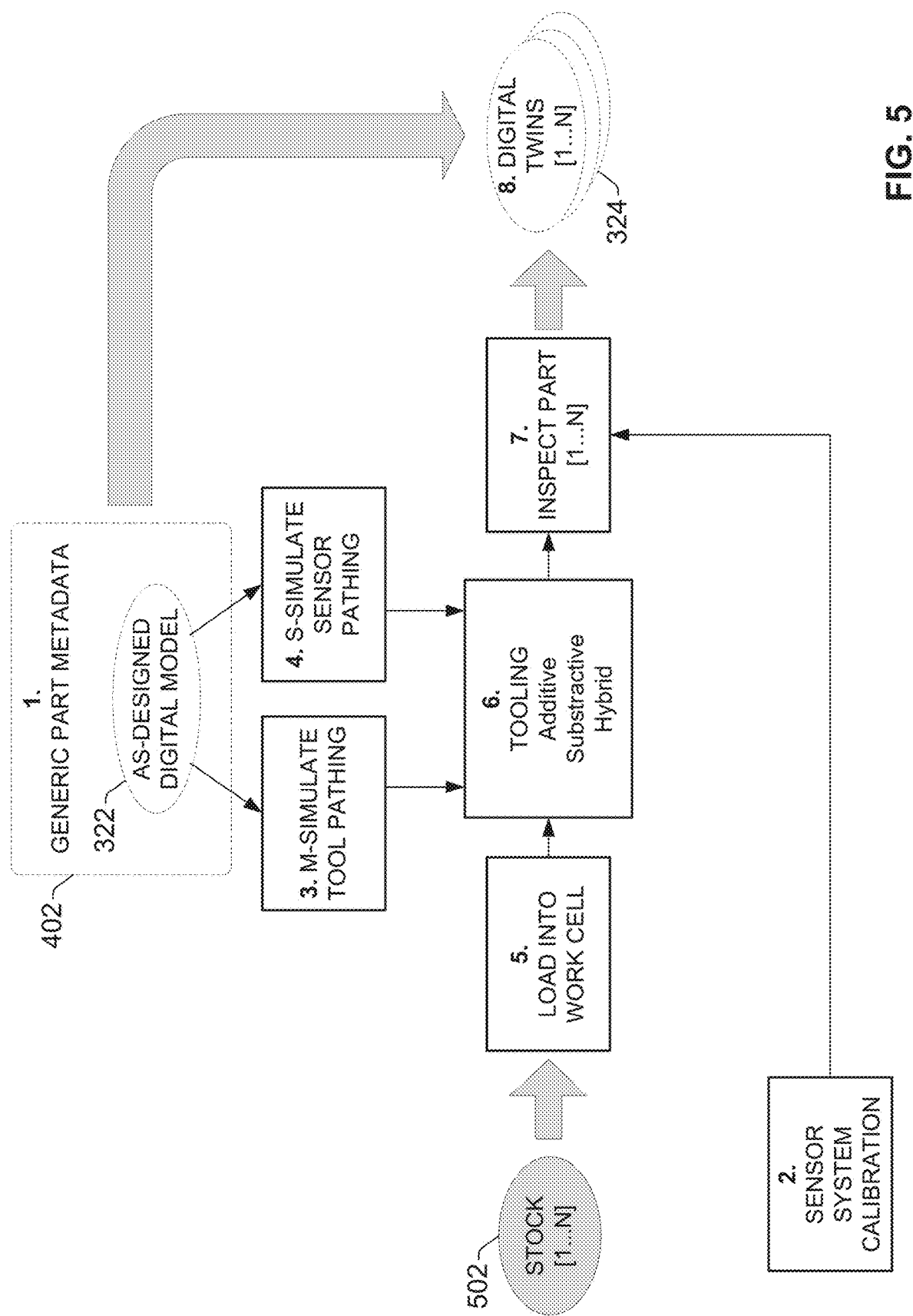
FIG. 5 is a process flow diagram illustrating an example process of manufacturing, in situ inspection, and digital twin creation that can be implemented by one or more embodiments of manufacturing control system.

FIG. 5 is a process flow diagram illustrating an example process of manufacturing, in situ inspection, and digital twin creation that can be implemented by one or more embodiments of manufacturing control system 302. In contrast to the process flow depicted in FIG. 2, both the manufacturing and inspection steps (steps 6 and 7) depicted in FIG. 4 can be performed without removing the part under production from the work envelope. Moreover, measured results of the in situ inspections are used to generate as-built digital twins 324 for each manufactured part.

The manufacturing system may be a subtractive machining system (e.g., a CNC machine), an additive manufacturing system (e.g., a 3D printer), or a hybrid additive and subtractive system. Before manufacturing begins, appropriate in situ sensor systems are installed within the work envelope of the manufacturing system. The sensor systems can include one or more metrology sensors capable of collecting measured inspection data from the workpiece while the workpiece is still in the work cell for the purpose of verifying conformance to design specifications, and to collect characteristic as-built metrology data for inclusion in the part's as-built digital twin 324. In various implementations, at least one of the metrology sensors may be a touch probe, a laser-based or ultrasound-based distance measurement device, an optical sensor, a surface flaw detector (e.g., an eddy current flaw detector), a contact dimensional instrument (e.g., a linear variable differential transformer), an alloy analyzer (e.g., an x-ray fluorescence analyzer), or another type of sensing device capable of measuring physical characteristics (e.g., surface topologies and dimensions, edge features, etc.) of the processed workpiece.

The present example assumes that generic part metadata 402 is available (step 1) and stored on the manufacturing control system 302 (e.g., in memory 320), or is otherwise accessible by the manufacturing control system 302. Generic part metadata 402 can include, but is not limited to, the as-designed digital model 322 that defines the desired final geometry of the part to be shaped by a machining or deposition tool under control of the manufacturing control system 302. Digital model 322 can define the as-designed dimensions and/or three-dimensional surface topologies of the finished part, including surface depths; curvatures; locations and dimensions of features such as holes, corners, or pockets; or other such geometric properties. Generic part metadata 402 may also include other globally applicable information pertaining to the part category to which the part belongs, including but not limited to material data identifying the materials used to produce instances of the part category, properties and behaviors common to all instances of the part category, as-designed simulation or test result data for the part, or other such information.

At step 2, each sensor system is calibrated so that measurement data collected by its associated sensors are registered in the same coordinate system used by the manufacturing system to manufacture the part. This will typically be the coordinate system of the digital model 322. Step 2 will typically be performed only once per part design before normal operation begins. However, for large or multiple runs the sensor calibration step may be repeated periodically to ensure a consistent frame of reference across all manufactured parts.

Figure 6:
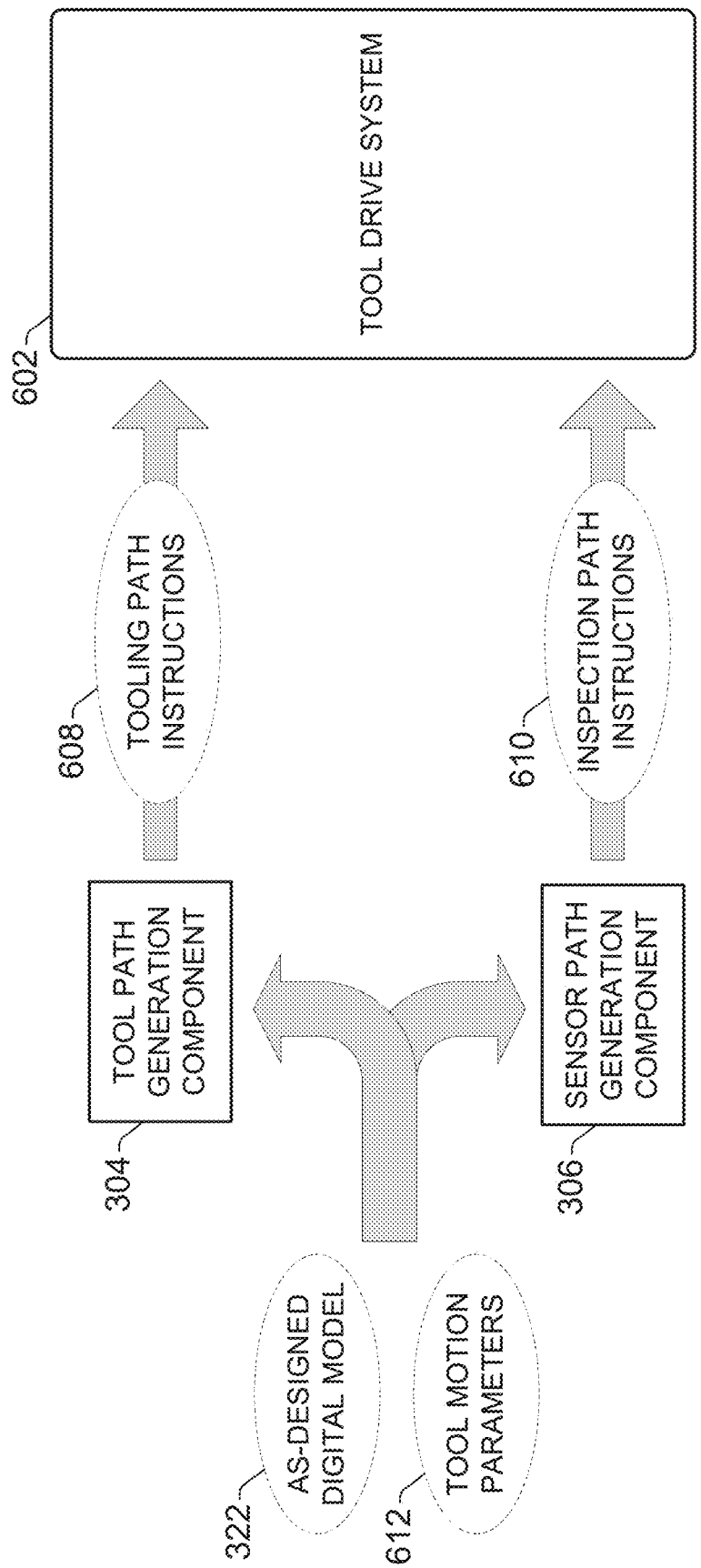
FIG. 6 is a diagram illustrating translation of an as-designed digital model to a set of tooling path instructions by a tool path generation component.

At step 3 (M-Simulate Sensor Pathing), the tool path generation component 304 determines and generates suitable NC instructions for controlling the associated machining or deposition tool (e.g., drill, lathe, shaper, mill, 3D printing deposition head, etc.) to convert a piece of stock material into an idealized finished part (in the case of a subtractive process) or to form the idealized finish part through controlled deposition of material (in the case of an additive process) in accordance with the digital model 322. In some embodiments, these NC instructions can be at least partially programmed by a programmer using suitable programming tools. The instructions may also be at least partially inferred or generated by the programming tools or by the manufacturing control system 302 itself based on the digital model 322. FIG. 6 is a diagram illustrating translation of an as-designed digital model 322 to a set of tooling path instructions 608 by the tool path generation component 304 according to one or more embodiments. Tool path generation component 304 can analyze the part topology and shape information defined by the digital model 322 together with the motion parameters of the tool controlled by the manufacturing control system 302 to determine one or more suitable tooling paths to be traversed by the tool in order to shape or build a finished part conforming to the digital model 322. To this end, tool path generation component 304 can reference, as inputs, the known motion parameters 612 of the tool, including but not limited to the tool's axes of motion and the ranges of motion of each axis (e.g., the tool's work envelope). Based on this information, tool path generation component 304 can generate tooling path instructions 608 defining suitable tooling paths —within the tool's defined limits of motion—that are estimated to yield a finished part or workpiece conforming to the design parameters defined in the digital model 322. These tooling path instructions 508 can be executed by the tool drive system 602, which maneuvers the tool in accordance with the instructions 608.

Figure 7:
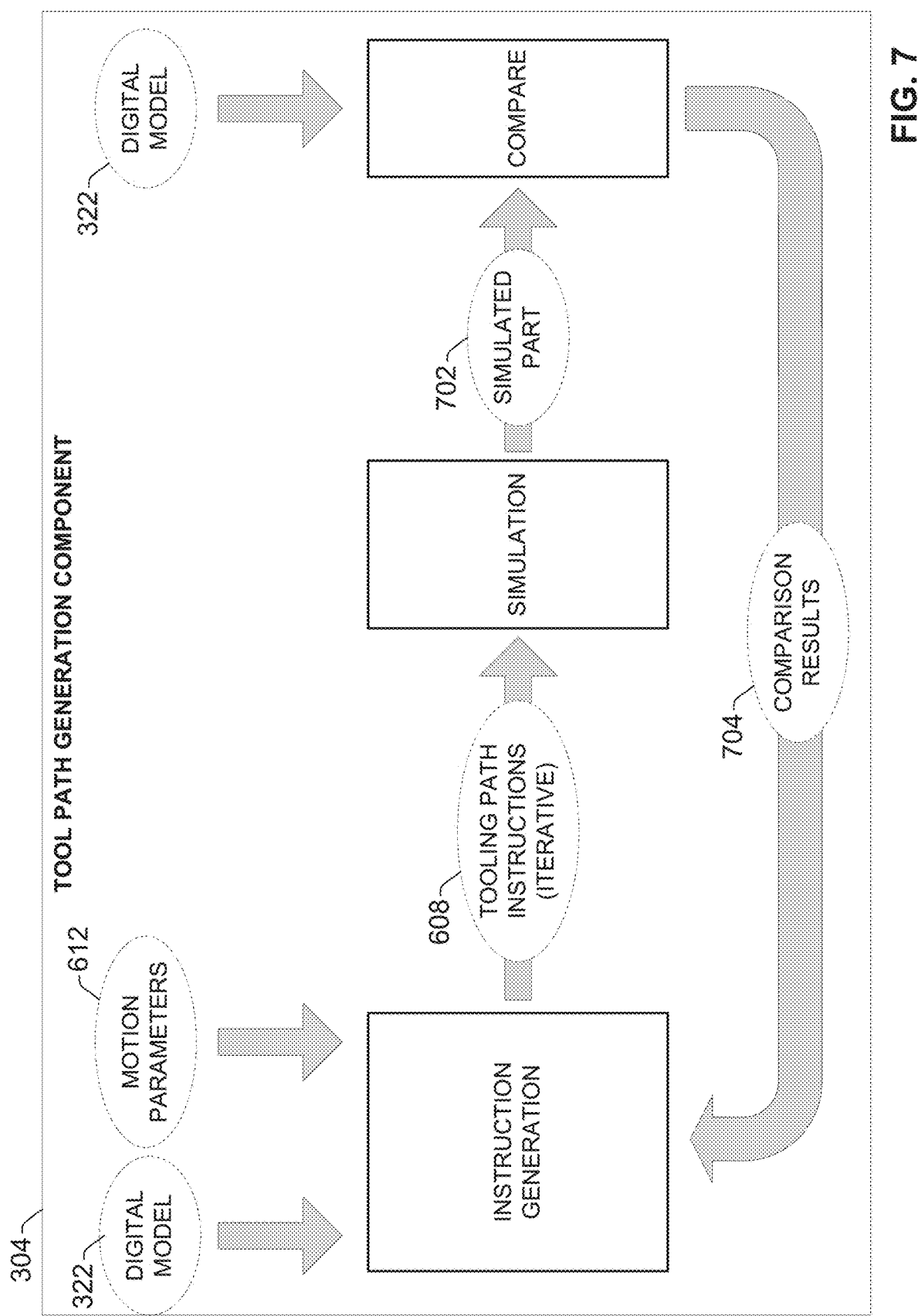
FIG. 7 is a diagram illustrating a generalized simulation processing that can be implemented by embodiments of a tool path generation component that support simulation.

In some embodiments, tool path generation component 304 can determine the suitable tool paths and corresponding tooling path instructions 608 using simulation techniques. FIG. 7 is a diagram illustrating a generalized simulation processing that can be implemented by embodiments of tool path generation component 304 that support simulation. In this example, tool path generation component 304 may generate an initial set of tooling path instructions 608 based on the as-designed digital model 322 and the motion parameters 612 of the tool, and execute a manufacturing simulation on this initial set of tooling path instructions 608. This simulation yields a simulated part model 702 that digitally represents a manufactured part that would result if the set of tooling path instructions 608 were executed by the tool.

The part model 702 is then compared with the as-designed digital model 322 to determine a degree of fidelity between the simulated part model 702 and the digital model 322. This comparison can identify areas of the simulated manufactured part having shapes, contours, or dimensions that deviate, in excess of defined tolerances, from corresponding features of the digital model 322. Results 704 of this comparison are used to modify the initial set of tooling path instructions 608 in a manner estimated to correct the deviations between the simulated part model 702 and the digital model 322. The resulting modified tooling path instructions 608 are then simulated to yield an updated simulated part model 702, which is again compared with the digital model 322. This process is iterated until the simulated part model 702 satisfies defined fidelity criteria relative to the digital model 322, and the finalized set of tooling path instructions 608 that gave rise to the acceptable simulated part model 702 are output by the tool path generation component 304. This simulation technique is only intended to be exemplary, and it is to be appreciated that any suitable simulation technique capable of generating a set of tooling path instructions 608 an additive and/or subtractive manufacturing cycle according to an as-designed digital model 322 are within the scope of one or more embodiments of this disclosure.

In some embodiments, the techniques described above for generating tooling path instructions 608 may be carried out on a separate system rather than being performed by the tool path generation component 304. In such embodiment, the tooling path instructions 608 can be developed offline and installed on the manufacturing control system 302 for execution.

Returning now to FIG. 6, at step 4 of the sequence (S-Simulate Tool Pathing), the sensor path generation component 306 determines and generates suitable NC instructions for controlling a path of motion of a metrology sensor to perform an automated inspection scan of the processed part while the part is still in the work cell. Step 4 may be executed in parallel with step 3 in some embodiments. As with the tool path developed at step 3, the sensor path may be at least partially programmed by a programmer, or may be at least partially generated automatically by the sensor path generation component 306. Since the sensor path is typically distinct from the manufacturing tool paths, the tool path generation component 304 and the sensor path generation component 306 generate respective distinct sets of instructions 608 and 610 for maneuvering the tool and the metrology sensor, as illustrated in FIG. 6.

In some embodiments, the sensor may be attached to the same spindle, or otherwise attached to the same articulating mechanism (e.g., robotic operating arm or another articulating structure) as the tool. In this configuration, sensor path generation component 306 can reference the same tool motion parameters 612 when generating a suitable inspection path, since the ranges of motion defined by these parameters will be the same for both the tool and the sensor. Since the sensor and the tool are manipulated by the same articulating structure in this scenario, the tooling path instructions 608 and the inspection path instructions 610 are both sent to the tool drive system 602 for execution during respective tooling and inspection phases.

In some embodiments, instead of an articulating sensor that collects inspection data from the workpiece by scanning across the workpiece according to a defined sensor path, a fixed sensor within the work cell may be used to obtain the inspection data. Such fixed sensors may include, for example, high-speed cameras, 3D cameras (e.g., time-of-flight cameras), vision cameras, or other types of sensors capable of collecting inspection data from a fixed location. In such configurations, step 4 of the process flow depicted in FIG. 5 may be omitted without departing from the scope of this disclosure.

Once the metrology sensors have been properly calibrated and instructions 608 and 610 have been generated, manufacture of parts in accordance with the design specifications set forth in digital model 322 can begin. Part manufacture involves repeated iterations of a tooling, inspection, and digital twin generation cycle—represented by steps 5-8 depicted in FIG. 5—carried out under the control of sequencing component 314. In an example subtractive manufacturing application—e.g., a machining operation by a CNC machine—a unit of stock material 502 (e.g., metal, plastic, glass, etc.) is first loaded into the machining work cell at step 5 (Load into Machining Cell). The stock material may be loaded either manually by an operator or via an automatic loader. Although the present example is discussed in connection with an example subtractive manufacturing system, it is to be understood that the general workflow discussed in this example is also applicable to additive manufacturing systems (e.g., 3D printing systems) as well as hybrid manufacturing systems that employ both additive and subtractive manufacturing cycles.

Figure 8:
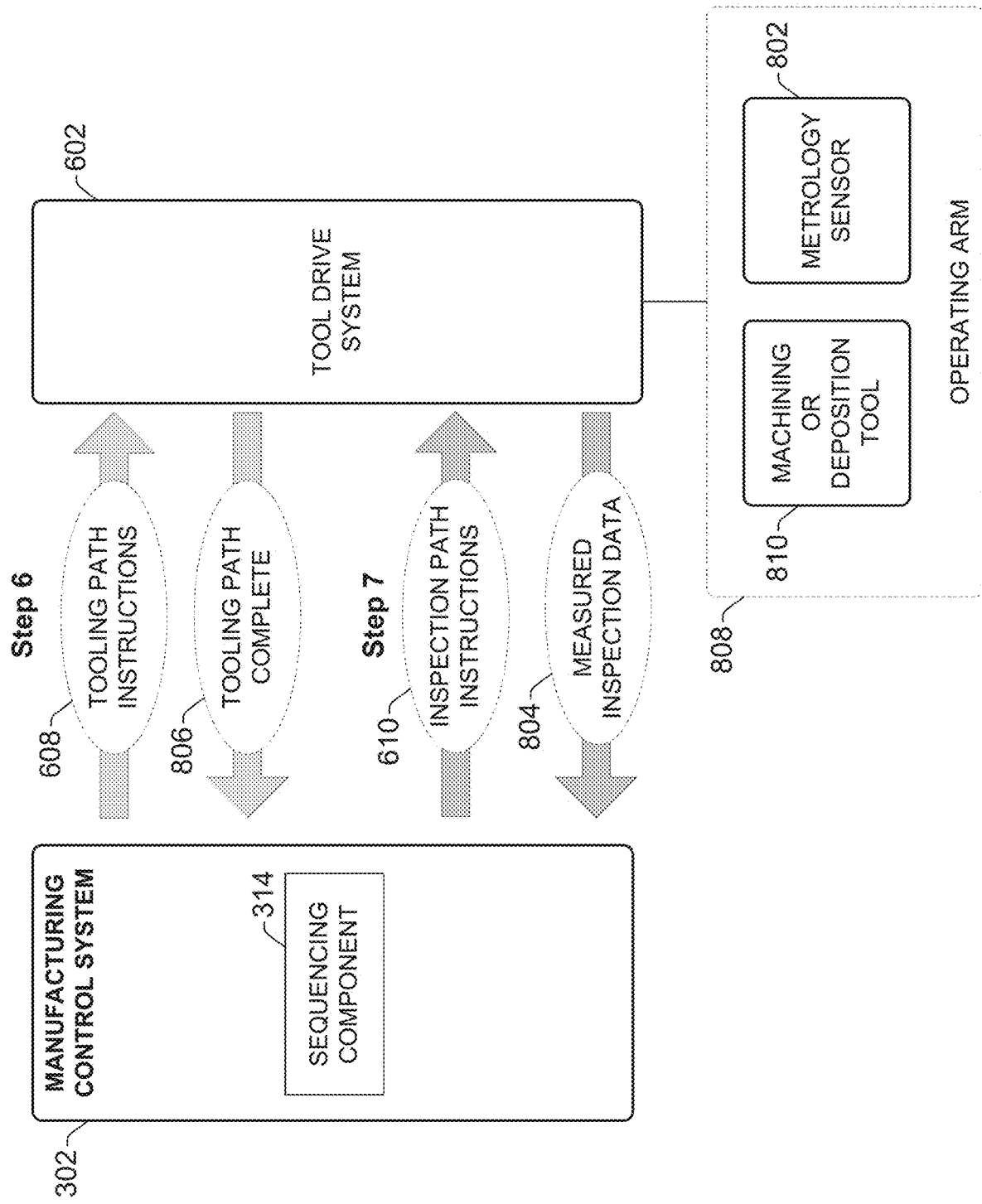
FIG. 8 is a diagram illustrating an example manufacturing and in situ inspection sequence as controlled by the sequencing component.

A machining and in situ inspection sequence is then carried out on the stock material at steps 6 (Machining) and 7 (Inspect Part). FIG. 8 is a diagram illustrating an example sequencing of steps 6 and 7 as controlled by the sequencing component 314. First, the unit of stock material 502 (not shown in FIG. 8) is machined at step 6 (Machining). During this step, sequencing component 314 instructs control system 302 to send the tooling path instructions 608 to the machining tool drive system 602, or to otherwise initiate execution of tooling path instructions 608 by the machining tool drive system 602. The drive system 602 then executes the tooling path instructions 608 to guide the machining tool 810 along the prescribed tooling path and to execute predefined tooling operations (e.g., drilling, cutting, lathing, etc.) at selected stages during the tool's motion. In some applications, the stock material 502 may be held fixed on a platform or bed as the machining tool 810 traverses the tooling path and performs its machining operations on the material. In other applications, such as lathe operations, the stock material may be rotated within the machining cell as the machining tool traverses its path over the material. In the case of additive machines (e.g., 3D printers) or hybrid machines, the tooling path may also build up portions of the workpiece by selective addition of material.

Execution of the tooling path instructions 608 transforms the unit of stock material 502 to a machined part or workpiece having machined or built surfaces that at least approximate the desired final workpiece geometry defined by the as-designed digital model 322. After the machining tool 810 has completed traversal of the prescribed tooling path defined by the tooling path instructions 608, drive system 602 generates a "tooling path complete" indication 806 to signal that the tooling path instructions 608 have completed execution. In response to receiving this indication 806, sequencing component 314 initiates step 7 (Inspect Part). During this step, manufacturing control system 302 instructs the machining tool drive system 602 to execute the inspection path instructions 610 generated by the sensor path generation component 306. Execution of the inspection path instructions 610 by the machining tool drive system 602 causes the metrology sensor 802 to be moved along the prescribed sensor path over the part.

In the example depicted in FIG. 8 it is assumed that the machining tool 810 and metrology sensor 802 are attached to the same operating arm 808, such that part inspection is accomplished by programmatically moving the sensor 802 using the same articulating mechanism (though via a different path of movement). This configuration can facilitate collection of the inspection data in the same coordinate system as that of the digital model 322, eliminating uncertainty introduced by the data alignment process that would otherwise be required if the part is inspected in a separate inspection station. This approach can also eliminate the need for a skilled technician to inspect the part, reduce the downtime required to transfer the part to a separate inspection station, and improve consistency of the inspection process and results.

The sensor 802 performs a measurement scan of the machined part during traversal along the sensor path and collects measured inspection data 804 for the machined part based on the measurement. For example, if the sensor 802 is a distance measurement device, the sensor 802 may emit a signal (e.g., a laser signal, an ultrasound signal, etc.) toward the part's surface during traversal along the scan path, and measure the return signal reflected from the part's surface to yield distance information for respective points along the scan path. The manufacturing control system 302 can synchronize the distance values obtained from the sensor 802 with positions and/or orientations of the sensor at the time the respective measurement values were obtained so that the distance values are correctly mapped to their corresponding points on the part surface. This measurement technique is only intended to be exemplary, and it is to be appreciated that other types of sensors and measurement techniques are also within the scope of one or more embodiments of this disclosure. In some embodiments, the measured inspection data 804 obtained by the sensor 802 may collectively yield a 3D image, a point cloud, a 3D faceted model, or another type of 3D representation of the part's surfaces.

Because of the sensor calibration performed at step 2—and facilitated in some embodiments by using the same operating arm 808 to maneuver both the tool 810 and the sensor 802 during respective tooling and inspection stages—the measured inspection data is collected and spatially registered to the coordinate system of the digital model 322. This allows the measured data to be easily integrated with generic part metadata 402 (including the digital model 322) to yield the as-built digital twin at step 8, to be described below.

Figure 9:
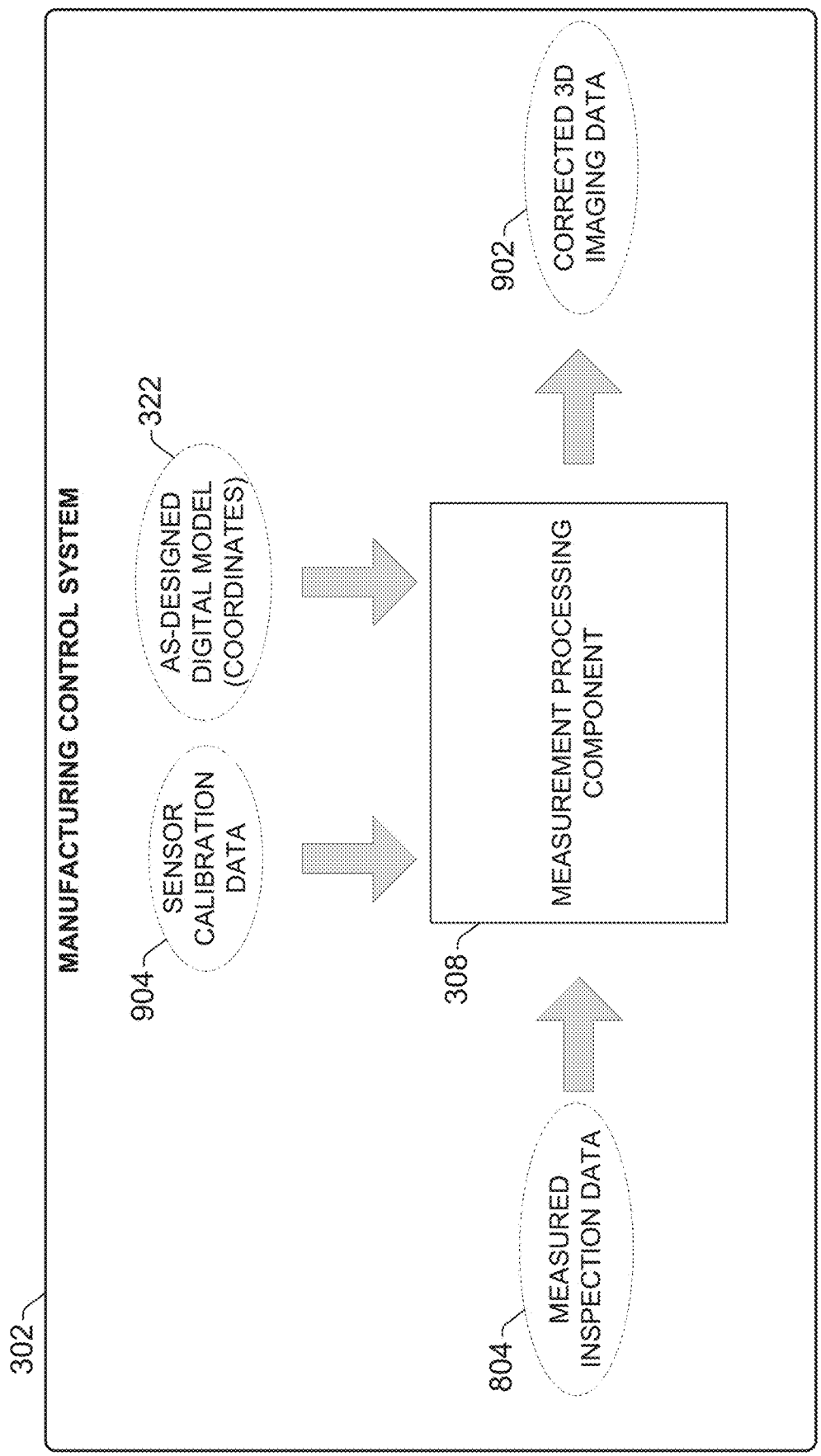
FIG. 9 is a block diagram illustrating an example data flow for image compensation processing.

In some embodiments, measurement processing component 308 can apply compensation processing to the measured inspection data 804 prior to storage and inclusion in a part-specific digital twin 324. FIG. 9 is a block diagram illustrating an example data flow for image compensation processing. During this step, the measurement processing component 308 applies compensation processing to the measured inspection data 804 collected during step 7 to compensate for sensor calibration. To compensate for sensor calibration, manufacturing control system 302 can be provided with sensor calibration data 904 that identifies calibration adjustments made to the metrology sensor 802 (e.g., scale factors, weight values, etc.). Such calibration adjustments are typically performed prior to normal operation. For example, during an initial calibration phase prior to normal manufacturing operation, raw sensor data can be aligned to the coordinates of the operating arm through a Euclidean transform having n degrees of freedom, where n corresponds to the number of axes of motion for the arm (e.g., three rotations and three translations in the case of an example machine with six degrees of freedom). Each of the degrees of freedom can be calibrated by either performing a mechanical adjustment that zeros the discrepancy between the ideal and the actual sensor values, or measuring and recording the discrepancy and applying a suitable correction factor to the raw sensor data that compensates for the discrepancy. Sensor calibration data 904 can include these correction factors, and measurement processing component 308 can apply this sensor calibration data 904 to the measured inspection data 804.

Measurement processing component 308 can also, if necessary, transform the measured inspection data 804 such that the three-dimensional coordinate system of the inspection data 804 is aligned to the coordinate system of the as-designed digital model 322. That is, the inspection data 804 is transformed such that the values making up the inspection data 804 relate to the coordinate system of the digital model 322. Aligning the coordinate systems of the measured inspection data 804 and the digital model 322 in this manner allows the inspection data 804 to be accurately mapped to the digital model 322 for the purpose of generating the as-built digital model of the part (which may include, for example, identifying deviations of the measured part surface from the as-designed surface recorded in the digital model 322). Using a consistent coordinate system for the inspection data 804 and the digital model 322 can simplify, and render more accurate, the process of integrating the inspection data 804 with the generic part metadata 402 (including the digital model 322) to yield the as-built digital twin 324 for the machined part.

Alignment of the coordinate systems can be simplified in embodiments in which the sensor 802 is attached to the same operating arm 808 as the tool 810. In conventional manufacturing approaches, if a processed part is removed from a work cell and inspected out-of-process (e.g., at a separate inspection station or laboratory), the resulting measurement data—which may be, for example, point cloud data or 3D image data representing the part's surface—will typically be generated using a different coordinate system from that of the digital model 322 of the idealized part. This necessitates reconciliation processing to place the measurement data in the same coordinate system as the digital model 322 (which may be the coordinate system used by the manufacturing system as the frame of reference for the manufacturing process). This data reconciliation process is both laborious and subject to inaccuracies. For example, some reconciliation approaches involve the use of fitting algorithms designed to find a best fit between the measurement data and the digital model 322, and these fitting algorithms may produce inaccurate results due to alignment error between the measurement data and the digital model 322. By contrast, if the sensor 802 is configured to perform part inspections within the work cell using the same operating arm 808 as the tool 810, the sensor 802 can be initially calibrated to the coordinate system of the digital model 322 so that the measured inspection data 804 is generated in the same coordinate system as the digital model 322 and the manufacturing data (e.g., encoder data) generated during manufacture of the part. This eliminates the need to subsequently align the inspection data 804 to the coordinate system of the digital model 322.

Measurement processing component 308 can also identify and repair modeling imperfections present in the measured inspection data 804. These imperfections can include, for example, degenerate facets, folded edges, self-intersections, inconsistent normal, or laminar slits.

The processing applied by the measurement processing component 308 on the measured 3D model of the part transforms the measured inspection data 804 to corrected 3D imaging data 902, which is the modeled representation of the as-built machined part. In some embodiments, prior to generating the as-built digital twin 324 for the finished part at step 8 of the process flow, manufacturing control system 302 can compare the corrected 3D imaging data 902 with the as-designed digital model 322 to determine a degree to which the geometry modeled by the corrected 3D imaging data 902—representing the measured surface topology of the machined part under production—conforms to the desired geometry modeled by the as-designed digital model 322, and generate new tooling path instructions for a subsequent machining path if the part geometry is found to deviate from the as-designed dimensions in excess of defined tolerances.

Figure 10:
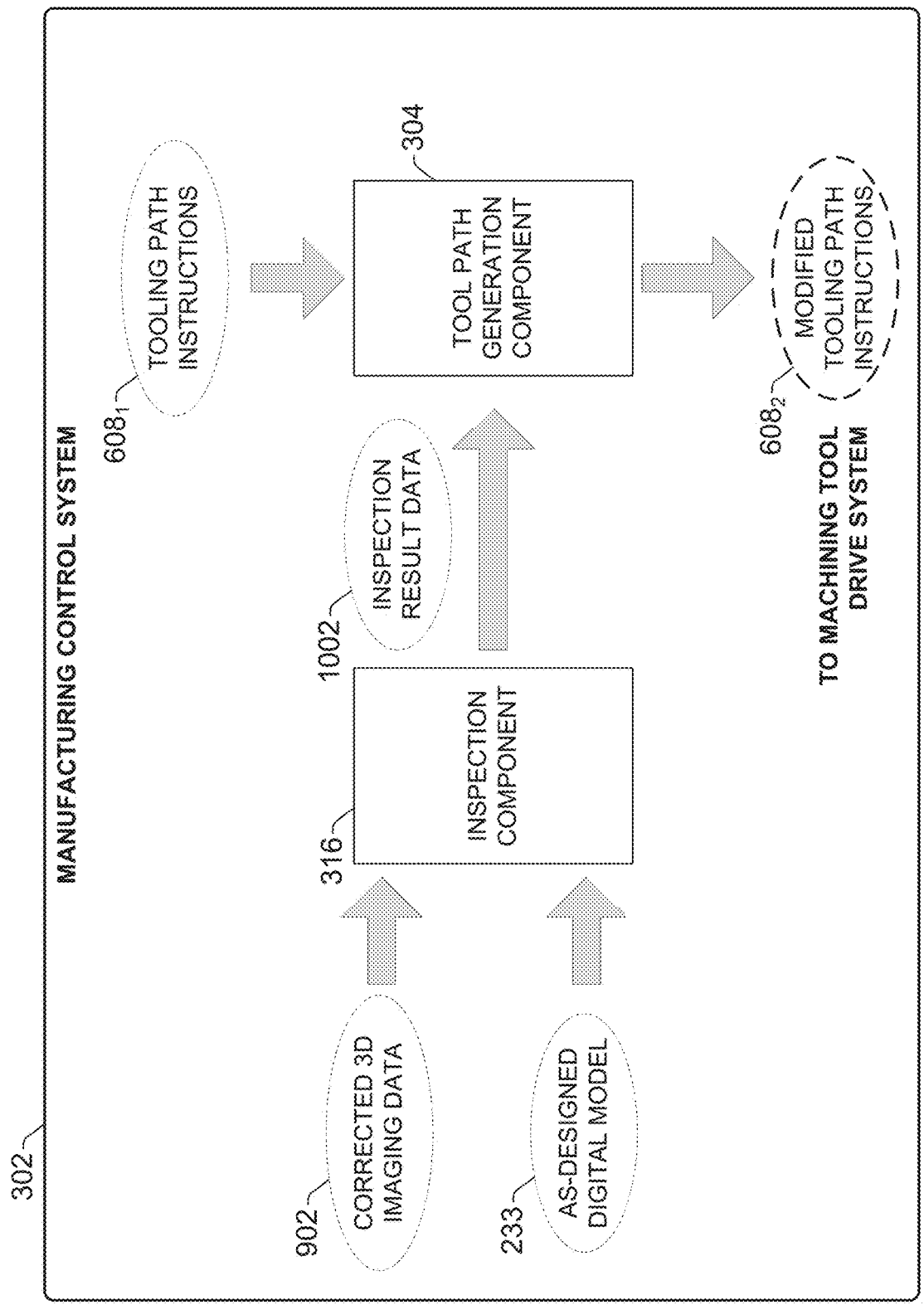
FIG. 10 is a block diagram illustrating modification of tooling path instructions based on a result of a comparison between corrected three-dimensional (3D) imaging data collected for a manufactured part and an as-designed digital model of the part.

FIG. 10 is a block diagram illustrating this process. In this example, an inspection component 316 of the manufacturing control system 302 can be trained to compare specific selected surfaces modeled by the corrected 3D imaging data 902 with the corresponding surfaces of digital model 322, and determine whether the surface's measured dimensions are within an acceptable tolerance defined for that surface by the digital model 322. This can include, for example, examining the depth of a crucial cut made in the stock material 502 by the tool 810 to ascertain whether the depth matches (within a defined tolerance) the as-designed depth defined by digital model 322. Other part characteristics that can be analyzed in this manner can include, but are not limited to, surface topologies; hole locations and sizes; pocket locations, sizes, and depths; edge locations and angles; or other such geometric characteristics.

If the inspection component 316 determines, based on this comparison, that the manufactured part is in tolerance and therefore passes inspection, machining of the present part is assumed to be completed and the sequencing component 314 instructs the digital twin generation component 310 to proceed with creation of an as-built digital twin 324 for the part. Alternatively, if the comparison determines that the part is not in tolerance, results of the comparison between the corrected 3D imaging data 902 and the digital model 322 can be fed back to the tool path generation component 304, which determines whether modifications can be made to the previously executed tooling path instructions 6081 for a subsequent tooling cycle in order to bring the part geometry into tolerance, and if so, appropriately modifies the previous tooling path instructions 6081 based on the comparison results. For example, if the comparison indicates that a first surface of the part is 0.005 inches too high (heavy) and a second surface of the part is 0.007 inches too low (light), the tool path generation component 304 may modify the previous tooling path instructions 6081 to increase the depth of cut of the first surface by 0.005 inches and to decrease the depth of cut of the second surface by 0.007 inches to compensate.

The modified tooling path instructions 6082 can then be sent to the tool drive system 602, and a second machining cycle can be performed on the part in accordance with the new instructions 6082. This tooling and inspection cycle (steps 6 and 7) can be repeated as needed for the current part under production until the comparison between the corrected 3D imaging data 902 and the as-designed digital model 322 determines that the geometry of the manufactured part is within defined tolerances of the as-designed digital model 322, or that the part cannot be brought into tolerance given the nature of the defects and the limitations of the tool's work envelope.

It is to be appreciated that some embodiments may omit this corrective re-tooling sequence without departing from the scope this disclosure. For example, some embodiments of manufacturing control system 302 may only perform one iteration of tooling and inspection for each manufactured part without performing a verification that the corrected 3D imaging data 902 is within tolerance of the digital model 322 or preforming a re-machining to correct identified defects.

Figure 11:
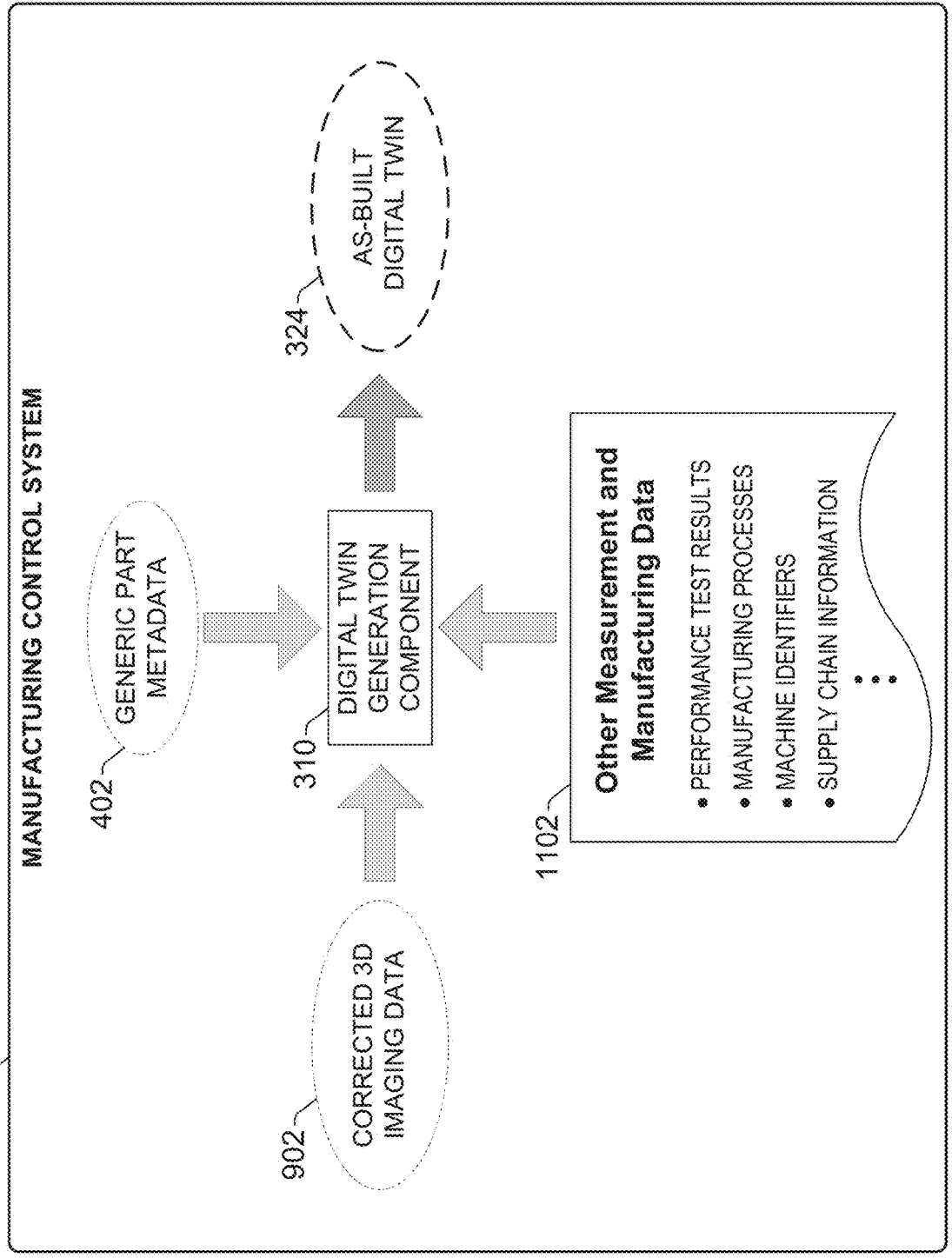
FIG. 11 is a block diagram illustrating generation of an as-built digital twin by a manufacturing control system.

Once tooling has been completed and the corrected 3D imaging data 902 has been obtained for the finished part, the 3D imaging data 902 is used to generate an as-built digital twin at step 8 of the process flow (Digital Twins). FIG. 11 is a block diagram illustrating this step. Upon completion of the tooling and inspection steps (steps 6 and 7), digital twin generation component 310 generates an as-built digital twin 324 for the finalized part based on an aggregation of the corrected 3D imaging data 902 captured by the metrology sensor for the as-built part with at least a portion of the generic part metadata 402 for the part category. In an example embodiment, generic part metadata 402 may include the as-designed digital model 322, and digital twin generation component 310 may generate the as-built digital twin 324 for the finished part by modifying one or more as-designed characteristics (e.g., dimensions, geometries, surface topologies, etc.) of the as-designed digital model 322 to reflect the actual measured characteristics recorded in the corrected 3D imaging data 902.

As noted above, since metrology sensor 802 is collected and registered the inspection data 804 in the same coordinate system as the digital model 322, the 3D imaging data 902 can be easily mapped to and aggregated with the digital model 322 without the need to perform reconciliation processing to align the imaging data 902 to the coordinate system of the digital model 322 (or the other generic part metadata 402).

In some embodiments, digital twin generation component 310 can also incorporate other measurement and/or manufacturing data 1102 from various sources into the as-built digital twin 324 for the finished part. This data 1102 can include, for example, manually collected metrology data for the part (e.g., measurement data collected outside the work envelop by an operator at an inspection station or laboratory), performance data obtained by performing operational tests on the part, manufacturing history data collected for the part during its production (e.g., identities of machines that were used to manufacture or assemble the part, manufacturing processes performed on the part, timestamps identifying when each manufacturing process was performed, etc.), supply chain information recording the part's traversal through various supply chain entities (e.g., suppliers, manufacturers, warehouses, retail entities, etc.), or other such part metadata.

Steps 5-8 of the process flow depicted in FIG. 5 can be repeated for each manufactured part of a production run. For example, for each part produced by a subtractive manufacturing process, a piece of stock material 502 is machined to yield a finished part in accordance with as-designed digital model 322, metrology data is collected for the finished part while the part remains in the machining work cell (e.g., by scanning the finished part with a metrology sensor manipulated by the same operating arm or spindle used to manipulate the machining tool) such that the metrology data is collected and registered in the same coordinate system as the digital model 322, the metrology data is processed as needed to yield an accurate 3D image or point cloud of the part's surfaces, and the resulting image data is combined with the digital model 322 to yield a custom as-built digital twin 324 for the finished part that accurately models the geometry and behavior of the part.

Part-specific digital twins 324 can be associated with their corresponding physical parts and made available to owners of the part for use in a variety of applications. In an example implementation, the as-built digital twin 324 for a given manufactured part may be stored on a memory device embedded in the finished part such that the digital twin 324 remains bundled with the physical part and can be electronically accessed by the owner of the part (e.g., by reading the digital twin 324 from the embedded memory using a suitable data reading device). In another example implementation, each part's corresponding digital twin 324 may be stored securely on a cloud platform and rendered accessible to owners of the part. For example, each part may be marked with a machine-readable code (e.g. a QR code) that can be scanned by a user's personal device and submitted to a website, which identifies, retrieves, and delivers the part's corresponding digital twin 324 for use by the owner. Other techniques for associating an as-built digital twin 324 with its corresponding physical part are also within the scope of one or more embodiments of this disclosure.

Figure 12:
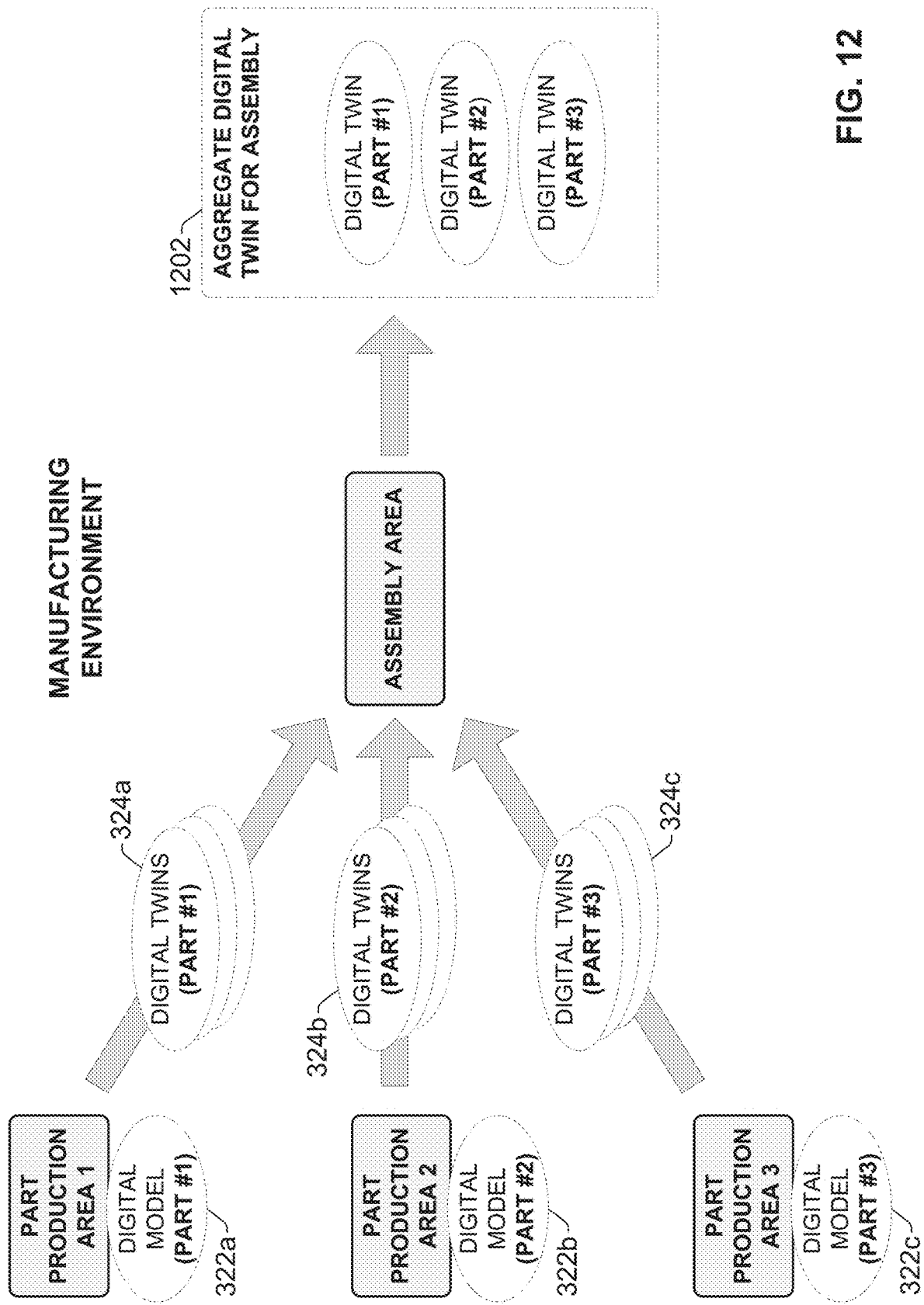
FIG. 12 is a diagram illustrating the use of as-built digital twins within a manufacturing environment for downstream assembly or manufacturing.
Figure 13:
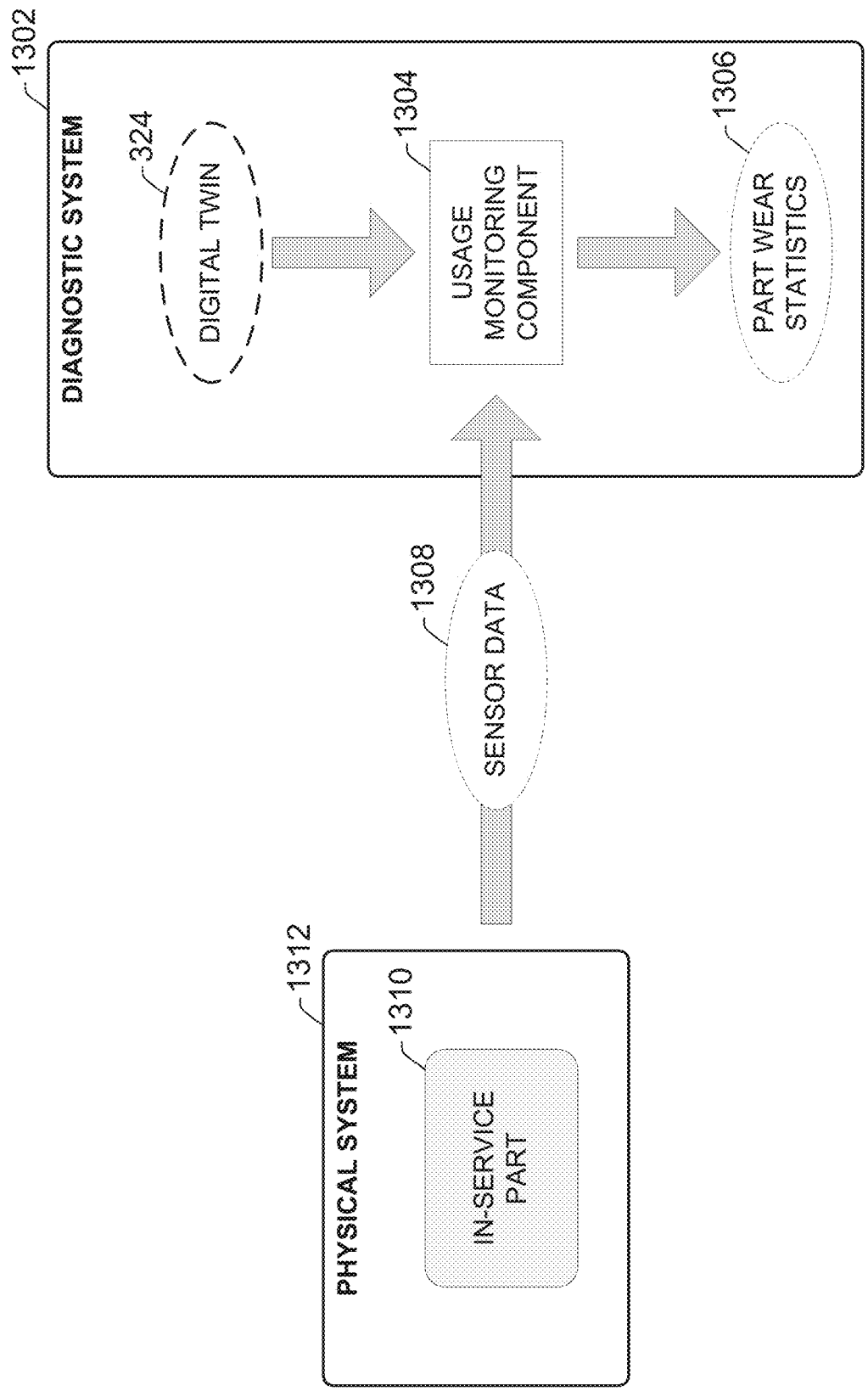
FIG. 13 is a diagram of an example use of an as-built digital twin in which the digital twin is used to monitor part wear trends or behavior of its associated part after the part has been deployed and placed into service.
Figure 14:
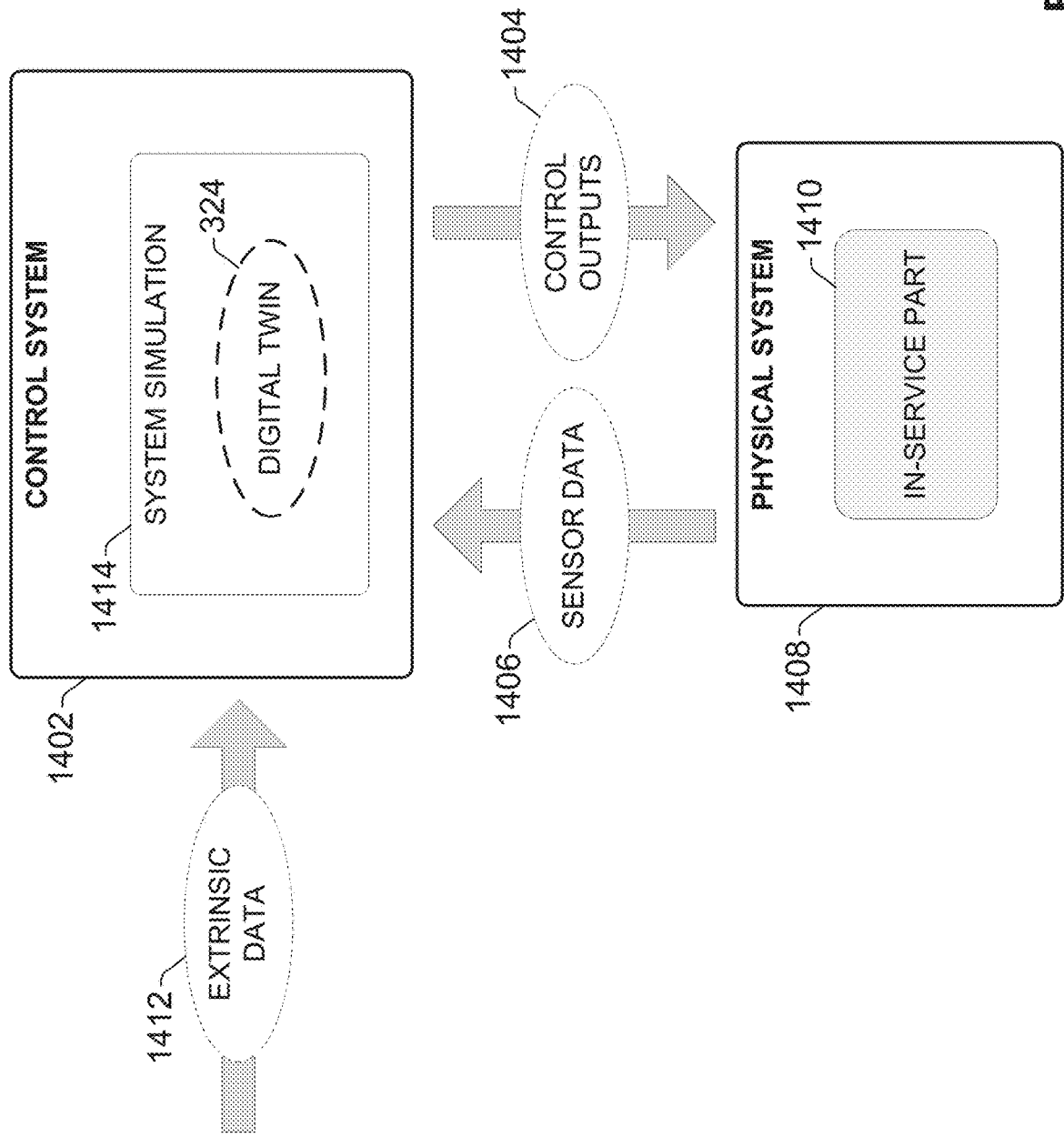
FIG. 14 is a diagram illustrating an example system in which an on-board control system leverages a digital twin of a manufactured part in connection with monitoring and control of a physical system that includes the part.

FIGS. 12-14 illustrate example applications or use cases of as-built digital twins 324. These examples are not intended to be exhaustive or exclusive, and it is to be appreciated that as-built digital twins 324 created using the techniques described herein can be used in substantially any type of application requiring an accurate digital model of a physical manufactured part.

FIG. 12 is a diagram illustrating the use of as-built digital twins 324 within the manufacturing environment for downstream assembly or manufacturing. In this example, Part Production Areas 1, 2, and 3 each manufacture a different mechanical component—Part #1, Part #2, and Part #3, respectively—to be assembled into a final assembled asset at a downstream assembly area. Each part production area operates an additive, subtractive, or hybrid machining system (e.g., a CNC machine, 3D printer, etc.) that produces its mechanical component using the process flow depicted in FIG. 5 and described above. As such, each manufactured instance of Part #1, Part #2, and Part #3 has an associated as-built digital twin 324 that models the part's measured as-built dimensions and geometry, and may include other metadata for the part (e.g., manufacturing history, performance test results, etc.).

For a given manufactured component (Part #1, Part #2, or Part #3), the as-built dimensions may vary across each manufactured instance of the component within acceptable design tolerances. For example, the as-designed digital model 322 used as the basis for the part's manufacture may define acceptable tolerances for respective different surfaces of the part, such that manufactured instances of the part will pass inspection provided the measured geometries of the respective surfaces are within their associated defined tolerances. Consequently, the exact dimensions of the parts passed to the assembly area may vary within these defined tolerances for a given manufactured component.

An assembly controller in the assembly area can be configured to assemble incoming instances of Part #1, Part #2, and Part #3 into an assembled mechanical asset. Since the particular surface dimensions can vary, within defined tolerances, across instances of each type of component, the integrity of the final mechanical assembly could be optimized by selecting respective instances of Part #1, Part #2, and Part #3 whose geometric tolerances are complementary to one another. For example, if the assembly involves mating a first surface of Part #1 with a second surface of Part #2, and the first surface of a given instance of Part #1 was measured to be slightly deeper than the ideal as-designed depth defined by digital model 322, the build integrity of the mechanical assembly could be optimized by selecting, for assembly with this instance of Part #1, an instance of Part #2 whose corresponding mating surface is slightly shallower than its as-designed depth by a magnitude similar to the deviation of the first surface. Selecting mating components with complementary tolerances in this manner may yield a final assembled asset having optimal mating integrity.

Since the geometries of each manufactured component were measured by one or more metrology sensors 802 while the part was in the work envelop and recorded in the part's digital twin 324, each digital twin 324 records, for respective surfaces of its corresponding component, a direction and magnitude of each surface's deviation from its as-designed geometry. The assembly controller in the assembly area analyzes the as-built digital twins 324 associated with the incoming components to identify, based on these in-tolerance deviations, a set of instances of Part #1, Part #2, and Part #3 having geometries that are optimally complementary to one another.

In an example implementation, component parts manufactured at the different part production areas are conveyed to the assembly area together with their corresponding digital twins 324. The digital twins 324 may be embedded in their associated parts (e.g., in readable memory embedded in the parts), or may be passed to the assembly controller over a network together with respective part identifiers identifying the parts modeled by the respective digital twins 324. At a given time, the assembly controller may have access to three groups of digital twins 324a, 324b, and 324c corresponding to instances of Part #1, Part #2, and Part #3 that are currently available for assembly.

For a given assembly cycle, the assembly controller can examine the available sets of digital twins 324a, 324b, and 324c to identify a set of Part #1, Part #2, and Part #3 digital twins 324 (that is, one digital twin from each of groups 324a, 324b, and 324c) having complementary geometries. In some embodiments, the assembly controller may execute a "best fit" algorithm that examines the direction and magnitude of deviations from as-designed dimensions of respective mating surfaces across the sets of digital twins 342a-324c, and determine a set of Part #1, Part #2, and Part #3 digital twins 324 whose dimensional deviations are determined to be most compatible (e.g., by identifying a first digital twin from 324a having a surface that is deeper than its as-designed depth by a certain magnitude and pairing this digital twin with a second digital twin from 324b having a mating surface that is shallower than its as-designed depth by a similar magnitude). The assembly controller can then select the parts corresponding to these selected digital twins 324 for inclusion in the current assembly under production. In some embodiments, the assembly controller may aggregate the digital twins corresponding to the three selected parts into an aggregate digital twin 1202 for the completed assembly.

Since the as-designed digital models 322a-322c used to manufacture Parts #1-#3 were defined using a common coordinate system, and the coordinate systems of the digital twins 324a-324c were synchronized with that used by the digital models 322a-322c as discussed above (by virtue of collecting and registering the measured inspection data 804 in this same coordinate system), the digital twins 324a-324c representing component parts can be accurately overlaid or compared for the purpose of identifying complementary geometric tolerances, and for the purpose of assembling the digital twins 324a-324c into a composite digital twin 1202, without the need to align coordinate systems between the digital twins 324.

FIG. 13 is a diagram of another example use of digital twin 324, in which the digital twin 324 is used to monitor part wear trends of the part after the part has been deployed and placed into service. In this example, a manufactured part 1310 has been placed into service as component of a physical system 1312. The physical system 1312 may include diagnostic sensors that measure indications of part wear or fatigue for the part 1310 during operation. Depending on the type of physical system 1312 and the nature of the part 1310, the sensors may monitor certain operational variables that can be translated to a metric of the part's degradation or wear over time, including but not limited to cycle times, speeds, downtime frequency or duration, or other such indicators.

A diagnostic system 1302 can perform lifecycle monitoring and management functions for the physical system 1312. This can include monitoring the part's operation over time to determine whether the part is wearing as expected given known lifecycle characteristics of the part. To this end, diagnostic system 1302 can include a usage monitoring component 1304 configured to analyze sensor data 1308 generated by the diagnostic sensors to identify a part degradation trend as a function of time. Diagnostic system 1302 stores a copy of the part's digital twin 324, which may encode expected lifecycle characteristics of the part 1310 based on the part's measured geometry and/or factory tests performed on the part 1310 prior to service (which may have been fed to the digital twin 324 as part of data 1102). Usage monitoring component 1304 can compare the part degradation trend —calculated based on sensor data 1308—with an expected degradation trend defined by the digital twin 324, and generate part wear statistics 1206 based on this comparison. Part wear statistics 1306 can indicate whether the part 1310 is wearing normally, or alternatively if the part 1310 is degrading at a faster rate than expected, necessitating a preemptive replacement of the part 1310.

Although the example depicted in FIG. 13 is described as monitoring part degradation, other operating characteristics can also be monitored against expected operation in a similar manner using digital twin 324.

As-built digital twins 324 can also be integrated into on-board control systems that monitor and control physical systems that include the machined parts. FIG. 14 is a diagram illustrating an example system in which an on-board control system 1402 leverages a digital twin 324 of a machined part 1410 in connection with monitoring and control of a physical system 1312 that includes the part 1410 as a component. The physical system 1408 maybe, for example, an avionics system, a drive system for an automated vehicle, or another type of controlled machine. Control system 1402 may be an embedded system that monitors measured sensor data 1406 from the physical system 1408 representing operational or status information for the system 1408, and generates control outputs 1404 directed to the physical system 1408 based on the sensor data 1406, where the control outputs 1404 are intended to maintain a desired operating state of the physical system 1408 given the actual measured conditions. In some scenarios, control system 1402 may also receive extrinsic data 1412 from other sources that may be relevant to the control decisions, such as current environmental conditions (e.g., external temperatures, wind speeds, levels of pollutants, etc.).

In this example, control system 1402 includes a simulation system 1414 that digitally models the physical system 1408 and performs virtual simulations of the physical system's operation under different scenarios. The simulation system 1414 can include the digital twin 324 representing the as-built part 1410 in the physical system 1408. Using the as-designed digital twin 324 in the simulation can improve the accuracy of the simulation results by taking into account the precise measured geometry and modeled behaviors of the as-built part 1410, rather than relying upon an idealized as-designed model of the part 1410 which may not accurately model the unique as-built characteristics of the part 1410. During operation, simulation system 1414 can measure current operating conditions and/or external conditions represented by the sensor data 1406 and extrinsic data 1412, and execute simulations on the virtualized physical system (including digital twin 324) under the current conditions and under respective optional control strategies in order to predict the physical system's response to the different control strategies under consideration. Based on these results, control system 1402 can set the control outputs 1404 in accordance with the control scenario whose simulation predicts a preferred outcome.

Simulations that incorporate digital twin 324 (or an aggregate digital twin 1202) can also be performed for the part prior to placing the part in service in order to predict how the part will perform in the field. In some embodiments, results of these simulations can be integrated into the digital twin 324 to further enhance the virtual model of the part.

Incorporating automated in situ part inspections into the manufacturing process as described herein renders 100% part inspection feasible, yielding more complete manufacturing records for batches of completed parts. Moreover, since accurate metrological data is collected for each part in a consistent coordinate system and in an automated manner, the control system can generate precise as-built digital twins for each part, which more accurately represent the finished part relative to a generic as-designed digital model.

Figure 15A:
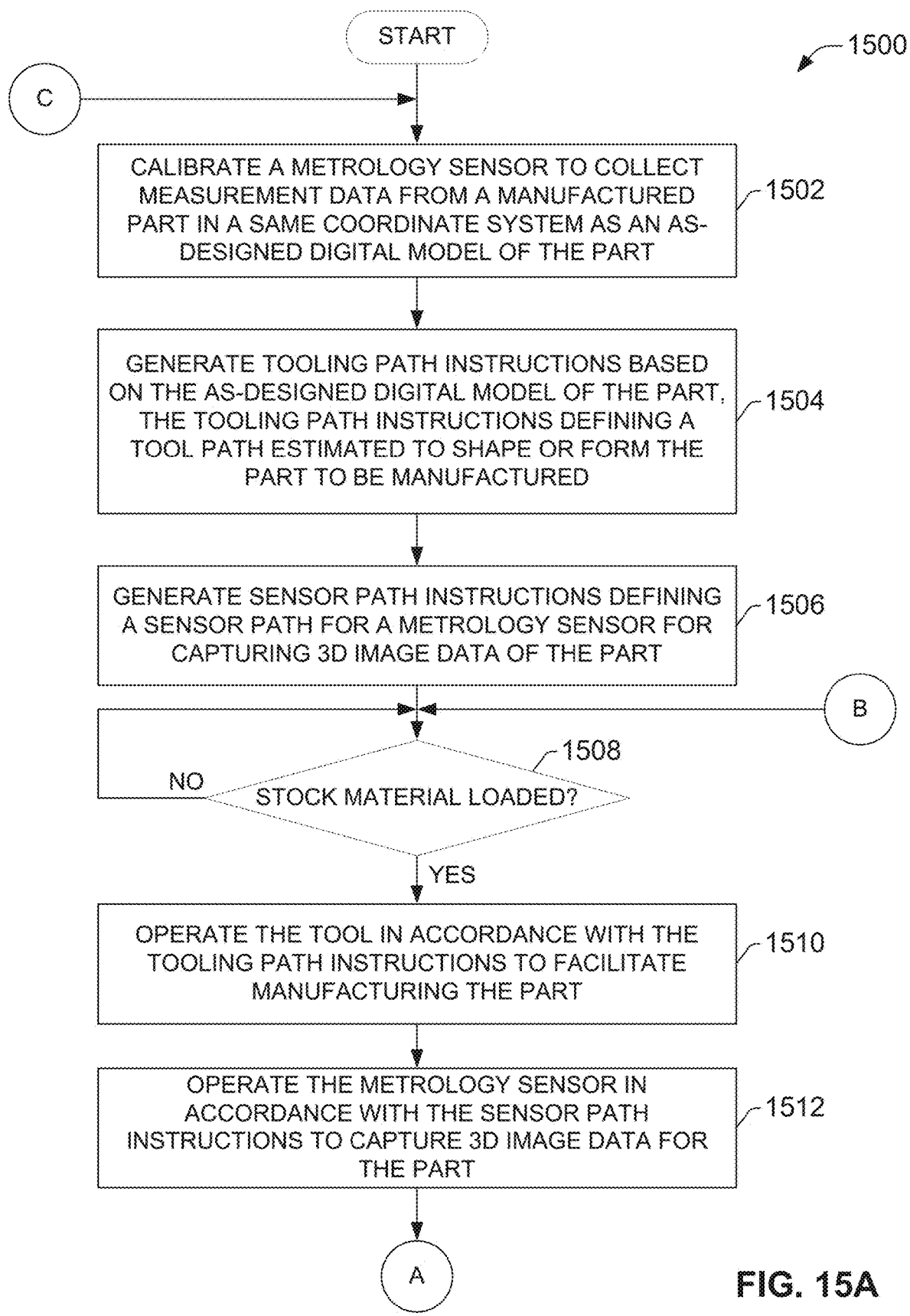
FIGS. 15A-15B are flowcharts of an example methodology for performing in situ inspection of a manufactured part and using results of the inspection to generate an as-built digital twin for the part.
Figure 15B:
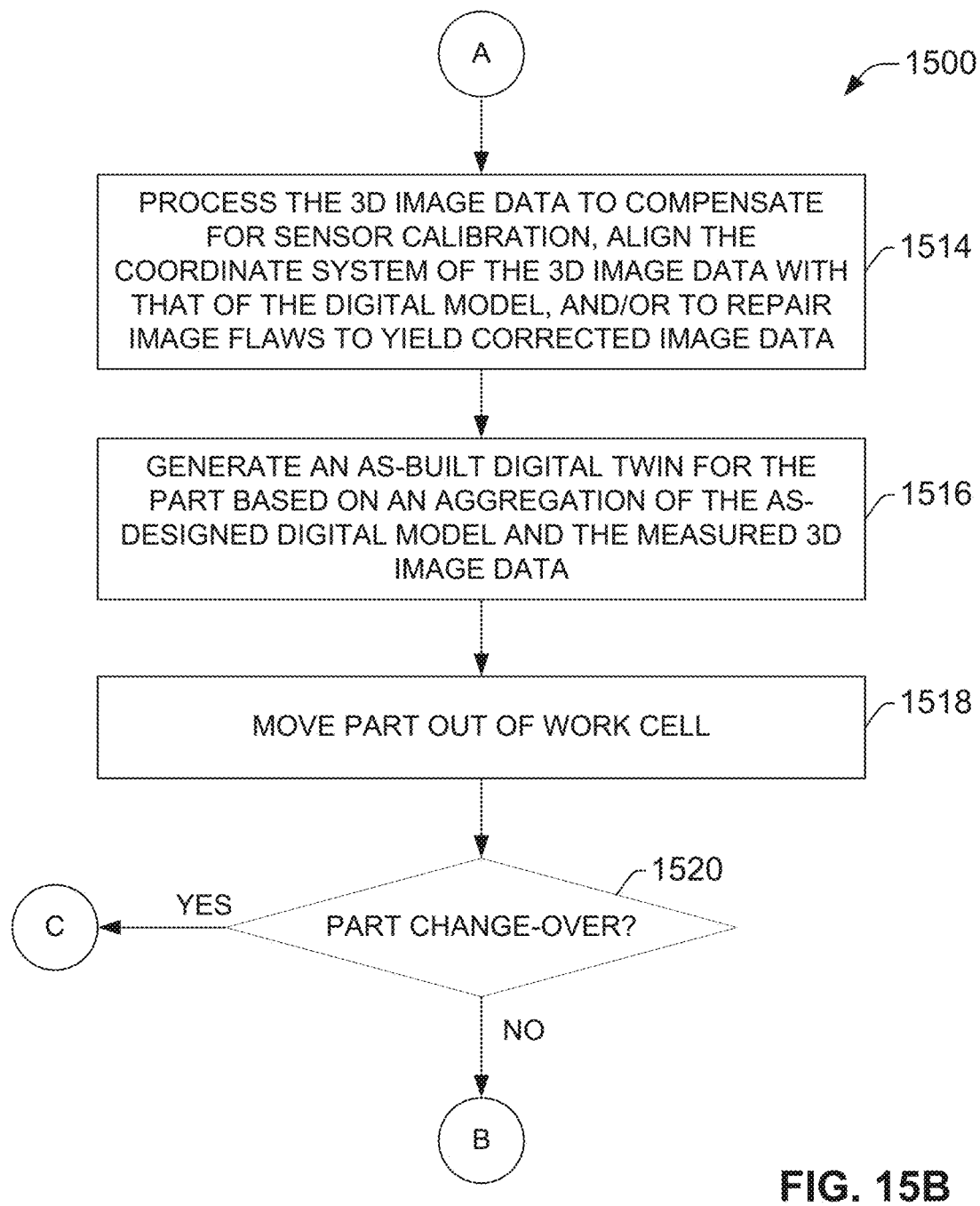

FIGS. 15A-15B illustrate a methodology in accordance with certain disclosed aspects. While, for purposes of simplicity of explanation, the methodology is shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on a computer-readable storage medium to facilitate transporting and transferring such methodologies to computers.

FIG. 15A illustrates a first part of an example methodology 1500 for performing in situ inspection of a manufactured part and using results of the inspection to generate an as-built digital twin for the part. At 1502, a metrology sensor is calibrated to collect measurement data (e.g., dimensional and/or geometric data) from a manufactured part in a same coordinate system as an as-designed digital model of the part to be manufactured. In some embodiments, the metrology sensor can reside within the same work cell as a work tool that will be used to form the part (e.g., by shaping a unit of stock material to yield a finished part using a subtractive manufacturing process, and/or by forming the part through controlled deposition of material using an additive manufacturing process). In an example configuration, the sensor may be attached to the same operating arm or spindle as the tool, allowing the same articulating mechanism to be used to both tool the part and scan the finished part with the metrology sensor to facilitate collection of inspection data for the part.

At 1504, tooling path instructions are generated based on the as-designed digital model of a part to be manufactured. The tooling path instructions define a machining tool path to be traversed by the tool (e.g., a tool of a subtractive, additive, or hybrid machining work cell) that is estimated to shape or form a unit of stock material to the part to be manufactured.

In some embodiments, the tooling path instructions may be at least partially written manually by a machine programmer. At least some of the tool path instructions may also be generated automatically based on analysis of the digital model of the part and the known motion parameters of the machining tool.

At 1506, sensor path instructions are generated defining a sensor path for the metrology sensor, where the sensor path is designed to capture 3D image data for the finished part. In embodiments in which the metrology sensor is attached to the same operating arm as the tool, the tooling path instructions and sensor path instructions can be executed on the same drive system that controls the operating arm. This configuration can also ensure that the collected sensor data is captured in the same coordinate system as that of the tooling process. Alternatively, the sensor may be a fixed sensor within the work cell that does not require a sensor path, in which case step 1506 can be omitted.

At 1508, a determination is made as to whether a unit of stock material has been loaded into the work cell. This step is only applicable in the case of a subtractive manufacturing process in which the stock material is to be machined by the tool to yield the finished part. If an additive manufacturing process is to be implemented, step 1508 can be omitted, since the part will be formed via controlled deposition of material by the tool (e.g., a 3D printing deposition head). When stock material has been loaded (YES at step 1508), the methodology proceeds to step 1510, where the tool is operated in accordance with the tooling path instructions generated at step 1504 to facilitate manufacturing the part (e.g., by either machining the stock material loaded at step 1508 or by depositing material in a controlled manner to build the part). At 1512, the metrology sensor is operated in accordance with the sensor path instructions generated at step 1506 to capture 3D image data for the resulting part. If the sensor is mounted to the same operating arm as the tool, the operating arm maneuvers the tool at step 1510 to tool the part and, upon completion of this tooling step, maneuvers the sensor over the machined part to collect the 3D image data. If the sensor is a fixed sensor, step 1512 may involve only operating the sensor to collect inspection data from the part without traversing a scan path.

The methodology continues in FIG. 15B. At 1514, the 3D image data collected at step 1512 is processed to compensate for sensor calibration, align the coordinate system of the 3D image data with that of the as-designed digital model if necessary, and/or repair flaws in the 3D image to yield corrected image data. At 1516, an as-built digital twin for the part is generated based on an aggregation of the as-designed digital twin and the measured 3D image data obtained at step 1514. The as-designed digital twin accurately models the finished part in terms of the part's measured dimensions and geometry, including any deviations from the idealized as-designed dimensions within acceptable tolerances, recording both the direction and magnitude of the deviations. The digital twin can also model expected behaviors and properties of the finished part based on the as-designed properties of the digital model as well as part-specific measurement and/or test result data collected for the part. In some embodiments, other part-specific data can be added to the digital twin at step 1516 in addition to the measured data obtained at step 1514, including but not limited to a production history of the part (e.g., the identities of machines or processes that have operated on the part, a time that each process was performed, etc.), supply chain tracking data recording the part's traversal across supply chain entities, test result data reflecting measured behaviors of the part under applied test conditions, or other such data.

At 1518, the finished part is moved out of the work cell. At 1520, a determination is made as to whether a part change-over is taking place, whereby the machining system is prepared to manufacture a different type of part having a different as-designed digital model. If no part change-over is taking place (NO at step 1520), the methodology returns to step 1508 and the system waits for another unit of stock material to be loaded into the machine for production of the next part (if the manufacturing process is a subtractive process). Steps 1508-1516 are then repeated to facilitate manufacturing the next part and generating its associated as-built digital twin. Steps 1508-1516 are repeated as many times as desired to yield a corresponding number of parts in accordance with the as-designed digital model. When a part change-over occurs (YES at step 1520), the methodology returns to step 1502, and steps 1502-1506 are repeated using a new as-designed digital model for the new type of part to be manufactured. Steps 1508-1516 are then repeated for a production run of the new type of part.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the machining control system described herein can be implemented in any computer system or environment having any number of memory or storage units (e.g., memory 320 of FIG. 3), and any number of applications and processes occurring across any number of storage units. This includes, but is not limited to, an environment with server computers and client computers deployed in a network environment or a distributed computing environment, having remote or local storage. For example, with reference to FIG. 3, the tool path generation component 304, sensor path generation component 306, measurement processing component 308, digital twin generation component 310, user interface component 312, sequencing component 314, and inspection component 316 can be stored on a single memory 320 associated with a single device, or can be distributed among multiple memories associated with respective multiple devices. Similarly, tool path generation component 304, sensor path generation component 306, measurement processing component 308, digital twin generation component 310, user interface component 312, sequencing component 314, and inspection component 316 can be executed by a single processor 318, or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 16:
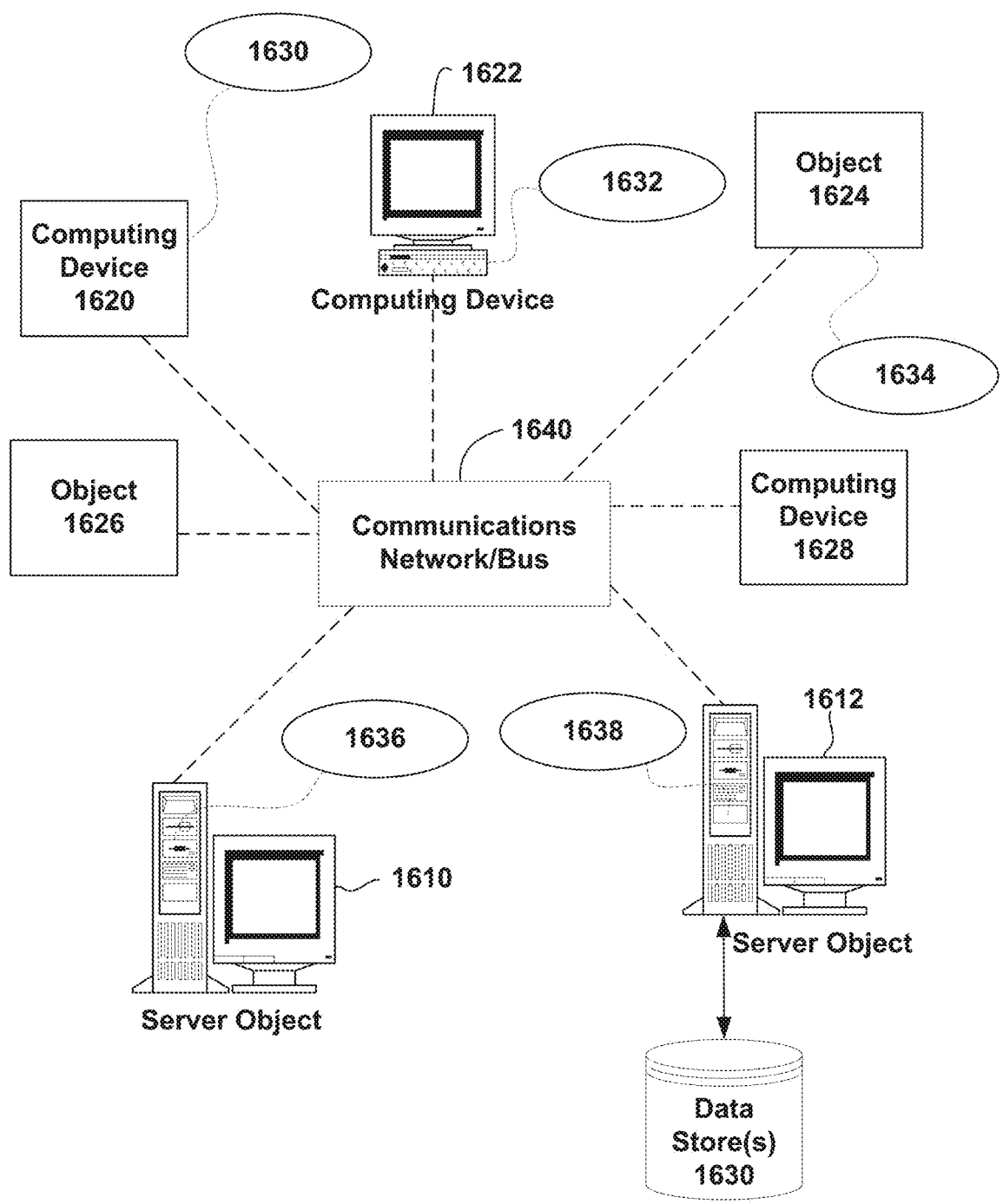
FIG. 16 is a block diagram representing an exemplary networked or distributed computing environment for implementing one or more embodiments described herein.

FIG. 16 provides a schematic diagram of an exemplary networked or distributed computing environment. The distributed computing environment includes computing objects 1610, 1612, etc. and computing objects or devices 1620, 1622, 1624, 1626, 1628, etc., which may include programs, methods, data stores, programmable logic, etc., as represented by applications 1630, 1632, 1634, 1636, 1638. It can be appreciated that computing objects 1610, 1612, etc. and computing objects or devices 1620, 1622, 1624, 1626, 1628, etc. may comprise different devices, such as personal digital assistants (PDAs), audio/video devices, mobile phones, MP3 players, personal computers, laptops, tablets, etc., where embodiments of the design system described herein may reside on or interact with such devices.

Each computing object 1610, 1612, etc. and computing objects or devices 1620, 1622, 1624, 1626, 1628, etc. can communicate with one or more other computing objects 1610, 1612, etc. and computing objects or devices 1620, 1622, 1624, 1626, 1628, etc. by way of the communications network 1640, either directly or indirectly. Even though illustrated as a single element in FIG. 16, communications network 1640 may comprise other computing objects and computing devices that provide services to the system of FIG. 16, and/or may represent multiple interconnected networks, which are not shown. Each computing object 1610, 1612, etc. or computing objects or devices 1620, 1622, 1624, 1626, 1628, etc. can also contain an application, such as applications 1630, 1632, 1634, 1636, 1638 (e.g., manufacturing control system 302 or components thereof), that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 16, as a non-limiting example, computing objects or devices 1620, 1622, 1624, 1626, 1628, etc. can be thought of as clients and computing objects 1610, 1612, etc. can be thought of as servers where computing objects 1610, 1612, etc. provide data services, such as receiving data from client computing objects or devices 1620, 1622, 1624, 1626, 1628, etc., storing of data, processing of data, transmitting data to client computing objects or devices 1620, 1622, 1624, 1626, 1628, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1640 is the Internet, for example, the computing objects 1610, 1612, etc. can be Web servers, file servers, media servers, etc. with which the client computing objects or devices 1620, 1622, 1624, 1626, 1628, etc. communicate via any of a number of known protocols, such as the hypertext transfer protocol (HTTP). Computing objects 1610, 1612, etc. may also serve as client computing objects or devices 1620, 1622, 1624, 1626, 1628, etc., as may be characteristic of a distributed computing environment.

Exemplary Computing Device

Figure 17:
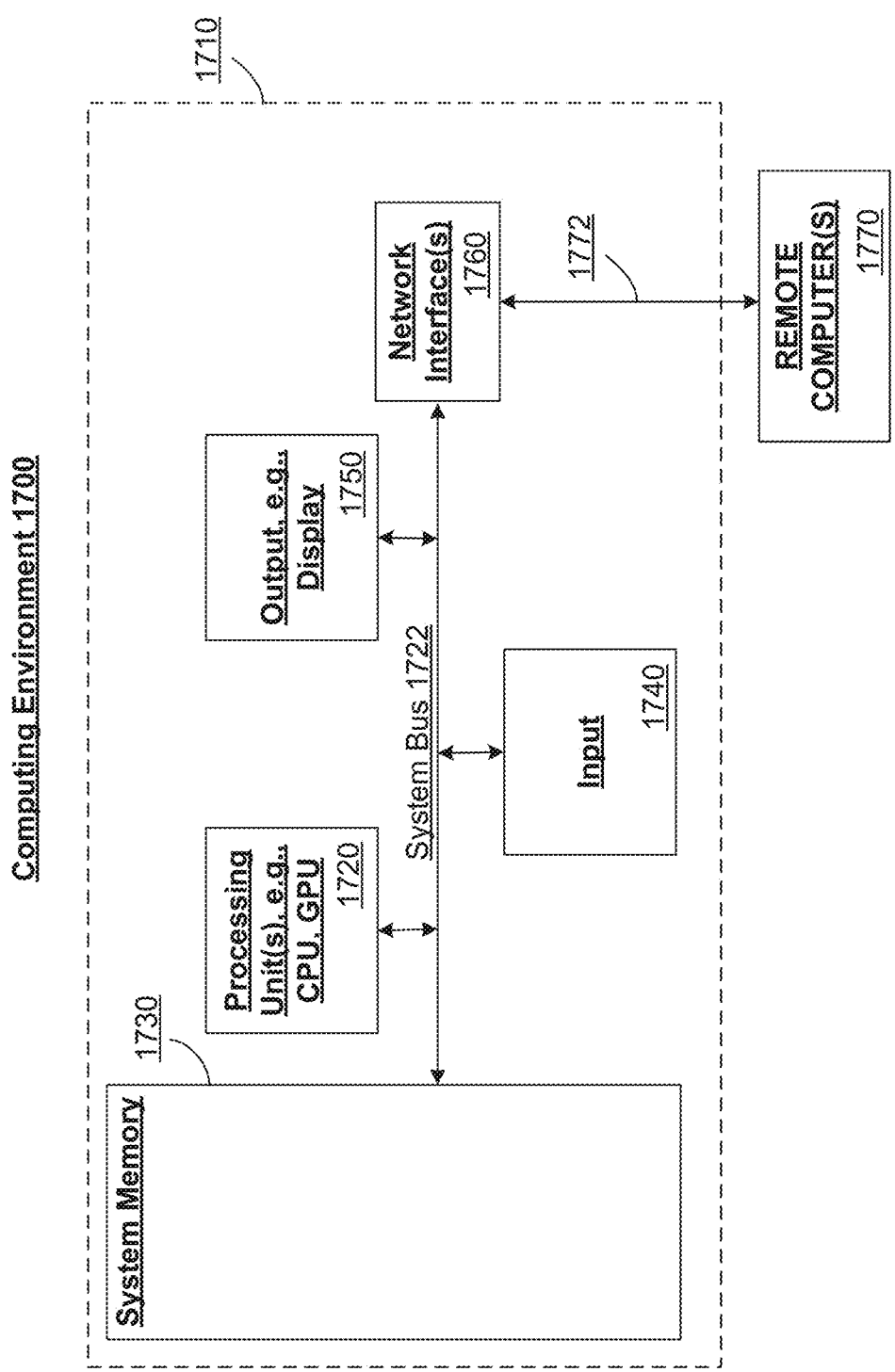
FIG. 17 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 17 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 17 thus illustrates an example of a suitable computing system environment 1700 in which one or aspects of the embodiments described herein can be implemented, although as made clear above, the computing system environment 1700 is only one example of a suitable computing environment and is not intended to suggest any limitation as to scope of use or functionality. Neither is the computing system environment 1700 be interpreted as having any dependency or requirement relating to any one or combination of components illustrated in the exemplary computing system environment 1700.

With reference to FIG. 17, an exemplary computing device for implementing one or more embodiments in the form of a computer 1710 is depicted. Components of computer 1710 may include, but are not limited to, a processing unit 1720, a system memory 1730, and a system bus 1722 that couples various system components including the system memory to the processing unit 1720. Processing unit 1720 may, for example, perform functions associated with processor(s) 318 of manufacturing control system 302, while system memory 1730 may perform functions associated with memory 320.

Computer 1710 typically includes a variety of computer readable media and can be any available media that can be accessed by computer 1710. The system memory 1730 may include computer storage media in the form of volatile and/or nonvolatile memory such as read only memory (ROM) and/or random access memory (RAM). By way of example, and not limitation, system memory 1730 may also include an operating system, application programs, other program modules, and program data.

A user can enter commands and information into the computer 1710 through input devices 1740, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1710. A monitor or other type of display device is also connected to the system bus 1722 via an interface, such as output interface 1750. In addition to a monitor, computers can also include other peripheral output devices such as speakers and a printer, which may be connected through output interface 1750. In one or more embodiments, input devices 1740 can provide user input to user interface component 312, while output interface 1750 can receive information relating to operations of the manufacturing control system 302 from user interface component 312.

The computer 1710 may operate in a networked or distributed environment using logical connections to one or more other remote computers, such as remote computer 1770. The remote computer 1770 may be a personal computer, a server, a router, a network PC, a peer device or other common network node, or any other remote media consumption or transmission device, and may include any or all of the elements described above relative to the computer 1710. The logical connections depicted in FIG. 17 include a network 1772, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art.

Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media (e.g., memory 320) and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the inferences described herein (e.g. in connection with curve fitting operations), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

In view of the exemplary systems described above, methodologies that may be implemented in accordance with the described subject matter will be better appreciated with reference to the flowcharts of the various figures (e.g., FIGS. 15A-15B). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A manufacturing control system, comprising:
   a memory; and
   a processor configured to execute components stored on the memory, the components comprising:
      a sequencing component configured to
         initiate execution of tooling path instructions, wherein the execution of the tooling path instructions causes a tool to traverse a defined tooling path estimated to fabricate a part in a work cell using at least one of subtractive or additive tooling in accordance with an as-designed digital model of an as-designed version of the part, and
         in response to completion of the execution of the tooling path instructions, initiate execution of inspection path instructions, wherein the execution of the inspection path instructions causes a metrology sensor to collect measured inspection data for the part while the machined part is in the work cell; and
      a digital twin generation component configured to generate an as-built digital twin based on an aggregation of the measured inspection data with generic part metadata describing as-designed properties of the as-designed version of the part, wherein the as-built digital twin models an as-built geometry of the part.

2. The manufacturing control system of claim 1, wherein the generic part metadata comprises at least one of the as-designed digital model, information identifying one or more materials used to produce the part, results of virtual simulations performed on a virtual instance of the as-designed version of the part, or behavior data defining expected behaviors of the part.

3. The manufacturing control system of claim 1, wherein the digital twin generation component is further configured to generate the as-built digital twin further based on at least one of performance test result data collected for the part, identities of one or more machines used to manufacture the part, identities of one or more manufacturing processes performed on the part, timestamps associated with the one or more manufacturing processes, or supply chain information for the part.

4. The manufacturing control system of claim 1, wherein
   the tool and the metrology sensor are attached to a same operating arm, and
   the execution of the inspection path instructions causes the metrology sensor to traverse a scan path over the part to facilitate collection of the measured inspection data.

5. The manufacturing control system of claim 4, wherein the measured inspection data is collected in a same coordinate system as the as-designed digital model.

6. The manufacturing control system of claim 1, further comprising a measurement processing component configured to perform processing on the measured inspection data prior generation of the as-built digital twin, wherein the processing comprises at least one of processing to compensate for calibration of the metrology sensor, alignment of a first coordinate system of the measured inspection data with a second coordinate system of the as-designed digital model, or processing to correct imaging defects in the measured inspection data.

7. The manufacturing control system of claim 1, wherein the metrology sensor is at least one of a touch probe, a laser-based or ultrasound-based distance measurement device, an optical sensor, a surface flaw detector, a contact dimensional instrument, or an alloy analyzer.

8. The manufacturing control system of claim 1, wherein the tool is a tool of at least one of a subtractive machining system, an additive machining system, or a hybrid machining system.

9. The manufacturing control system of claim 1, wherein the as-built digital twin is configured to simulate the part in a virtual simulation of a mechanical asset that includes the part.

10. The manufacturing control system of claim 1, wherein
the as-built digital twin is a first as-built digital twin,
the part is a first part, and
the first as-built digital twin is configured to be integrated with a second as-built digital twin that models a second part to yield an aggregate digital twin that models a mechanical assembly comprising the first part and the machined part.

11. A method for manufacturing a workpiece, comprising:
executing, by a system comprising a processor, tooling path instructions that cause a tool within a work cell to move through a tooling path designed to form, using at least one of a subtractive tooling process or an additive tooling process, a part that conforms to an as-designed digital model of a generic part category to which the part belongs;
in response to an indication that the tooling path instructions have completed execution, executing, by the system, inspection path instructions that cause a metrology sensor to collect measured inspection data for the part while the part remains in the work cell; and
aggregating, by the system, the measured inspection data with generic part metadata describing as-designed properties of the generic part category to yield an as-built digital twin of the part, wherein the as-built digital twin models an as-built geometry of the part.

12. The method of claim 11, wherein the aggregating comprises aggregating, as the generic part metadata, at least one of the as-designed digital model, information identifying one or more materials used to produce the part, simulation data representing a result of a virtual simulation performed on a virtual instance of an as-designed version of the part, or behavior data defining expected behaviors of the part.

13. The method of claim 11, further comprising generating, by the system, the as-built digital twin further based on at least one of performance test result data collected for the part, identities of one or more machines used to manufacture the part, identities of one or more manufacturing processes performed on the part, timestamps associated with the one or more manufacturing processes, or supply chain information for the part.

14. The method of claim 11, wherein
the tool and the metrology sensor are attached to a same operating arm, and
the executing of the inspection path instructions causes the metrology sensor to move through a scan path over the part to facilitate collection of the measured inspection data.

15. The method of claim 14, wherein the executing of the inspection path instructions comprises collecting the measured inspection data in a same coordinate system as the as-designed digital model.

16. The method of claim 11, further comprising processing, by the system, the measured inspection data prior to the aggregating, wherein the processing comprises at least one of processing to compensate for calibration of the metrology sensor, aligning a first coordinate system of the measured inspection data with a second coordinate system of the as-designed digital model, or processing to correct imaging defects in the measured inspection data.

17. The method of claim 11, wherein
the as-built digital twin is a first as-built digital twin,
the part is a first part, and
the method further comprises integrating, by the system, the first as-built digital twin with a second as-built digital twin that models a second part to yield an aggregate digital twin that models a mechanical assembly comprising the first part and the second part.

18. The method of claim 11, further comprising integrating, by the system, the as-built digital model into a virtual simulation of a mechanical asset that includes the part.

19. A non-transitory computer-readable medium having stored thereon computer-executable instructions that, in response to execution, cause a machining control system to perform operations, comprising:
executing tooling path instructions that instruct a tool to traverse a tooling path designed to fabricate a workpiece within a work cell in accordance with an as-designed digital model of an as-designed version of the workpiece;
in response to a determination that execution of the tooling path instructions has completed, executing inspection path instructions that cause a metrology sensor to collect measured inspection data for the workpiece while the workpiece remains inside in the work cell; and
generating an as-built digital twin of the workpiece based on an integration of the measured inspection data with generic workpiece metadata representing as-designed properties of the as-designed version of the workpiece, wherein the as-designed digital twin models the workpiece including an as-built geometry of the workpiece.

20. The non-transitory computer-readable medium of claim 19, wherein the generating comprises integrating, as the generic workpiece metadata, at least one of the as-designed digital model, information identifying one or more materials used to produce the workpiece, simulation data representing a result of a virtual simulation performed on a virtual instance of the as-designed version of the workpiece, or behavior data defining expected behaviors of the workpiece.

* * * * *